United States Patent
Gyoda et al.

(10) Patent No.: US 10,228,534 B2
(45) Date of Patent: Mar. 12, 2019

(54) OPTICAL SYSTEM AND IMAGE PICKUP APPARATUS INCLUDING THE SAME

(71) Applicant: CANON KABUSHIKI KAISHA, Tokyo (JP)

(72) Inventors: Yuichi Gyoda, Utsunomiya (JP); Suguru Inoue, Utsunomiya (JP); Shigenobu Sugita, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/607,185

(22) Filed: May 26, 2017

(65) Prior Publication Data
US 2017/0351059 A1 Dec. 7, 2017

(30) Foreign Application Priority Data
Jun. 1, 2016 (JP) .................. 2016-109657

(51) Int. Cl.
*G02B 9/12* (2006.01)
*G02B 9/60* (2006.01)
(Continued)

(52) U.S. Cl.
CPC .............. *G02B 9/12* (2013.01); *G02B 13/02* (2013.01); *G02B 15/14* (2013.01); *G02B 15/24* (2013.01);
(Continued)

(58) Field of Classification Search
CPC .... G02B 13/02; G02B 13/0035; G02B 13/18; G02B 13/004; G02B 13/04; G02B 13/0045; G02B 13/0015; G02B 13/009; G02B 9/00; G02B 9/12; G02B 9/14; G02B 9/60; G02B 9/62; G02B 15/14–15/17; G02B 15/20; G02B 15/22; G02B 15/24; G02B 15/26;
(Continued)

(56) References Cited

U.S. PATENT DOCUMENTS 6,115,188 A * 9/2000 Nishio ................. G02B 15/173
359/557
7,609,446 B2 * 10/2009 Nanba .................. G02B 27/646
359/554
(Continued)

FOREIGN PATENT DOCUMENTS

JP 2014-026023 A 2/2014
JP 2014-56195 A1 3/2014
(Continued)

*Primary Examiner* — Loha Ben
(74) *Attorney, Agent, or Firm* — Canon U.S.A., Inc. IP Division

(57) ABSTRACT

An optical system includes a first lens unit that has positive refractive power, a second lens unit that moves during focusing and that has positive refractive power or negative refractive power, and a third lens unit that has positive refractive power or negative refractive power. The first lens unit, the second lens unit, and the third lens unit are disposed in that order from an object side to an image side. During focusing, an interval between adjacent lens units changes. In the optical system, a focal length f of the entire optical system, a distance LD along an optical axis from a lens surface of the first lens unit that is closest to the object side to an image plane, and focal lengths of positive and negative lenses that are included in the first lens unit are appropriately set.

7 Claims, 29 Drawing Sheets

(51) Int. Cl.
  *G02B 13/02* (2006.01)
  *G02B 15/14* (2006.01)
  *G02B 15/24* (2006.01)
  *G02B 27/00* (2006.01)
  *G02B 27/64* (2006.01)
  *G02B 13/00* (2006.01)
  *G02B 13/18* (2006.01)
  *G02B 9/62* (2006.01)

(52) U.S. Cl.
  CPC ..... *G02B 27/0025* (2013.01); *G02B 27/0062* (2013.01); *G02B 27/646* (2013.01); *G02B 9/60* (2013.01); *G02B 9/62* (2013.01); *G02B 13/009* (2013.01); *G02B 13/0035* (2013.01); *G02B 13/0045* (2013.01); *G02B 13/18* (2013.01); *G02B 27/64* (2013.01)

(58) Field of Classification Search
  CPC ........ G02B 15/28; G02B 15/173; G02B 3/02; G02B 3/0081; G02B 27/0025; G02B 27/0062; G02B 27/05; G02B 27/64; G02B 27/646; G02B 21/02; G02B 21/025
  USPC ....... 359/694, 645, 651, 661, 662, 683, 685, 359/689, 690, 695, 713, 714, 716, 359/733–735, 771–775, 779, 780, 784, 359/785, 787, 752–754, 759, 760, 765, 359/766, 746, 791, 792, 823, 379, 380, 359/421, 422, 554, 557, 615, 658, 659, 359/676, 677
  See application file for complete search history.

(56) References Cited

U.S. PATENT DOCUMENTS

| | | | | |
|---|---|---|---|---|
| 7,626,771 B2 * | 12/2009 | Yokoyama | ........... | G02B 15/161 359/754 |
| 7,894,135 B2 * | 2/2011 | Nanba | ................. | G02B 27/646 359/557 |
| 7,948,691 B2 * | 5/2011 | Okumura | ........... | G02B 27/0025 359/745 |
| 8,223,436 B2 * | 7/2012 | Sugita | ................ | G02B 27/0062 359/675 |
| 8,314,996 B2 * | 11/2012 | Nanba | ................. | G02B 15/173 359/686 |
| 8,331,034 B2 * | 12/2012 | Kimura | ................ | G02B 15/173 359/676 |
| 8,503,095 B2 * | 8/2013 | Kimura | ................ | G02B 15/173 359/683 |
| 8,681,433 B2 * | 3/2014 | Ono | ....................... | G02B 15/14 359/684 |
| 8,705,180 B2 * | 4/2014 | Takano | .................. | G02B 15/17 359/676 |
| 9,081,170 B2 * | 7/2015 | Kimura | ................ | G02B 27/646 |
| 9,134,512 B2 * | 9/2015 | Iwamoto | ........... | G02B 13/009 |
| 9,678,318 B2 * | 6/2017 | Nakamura | ........... | G02B 15/173 |
| 9,946,065 B2 * | 4/2018 | Okumura | ........... | G02B 27/0062 |
| 9,983,392 B2 * | 5/2018 | Inoue | .................... | G02B 13/04 |
| 2011/0080654 A1 | 4/2011 | Okumura | | |
| 2013/0194487 A1 | 8/2013 | Eguchi | | |
| 2017/0351060 A1 * | 12/2017 | Sugita | ..................... | G02B 9/12 |
| 2017/0351089 A1 * | 12/2017 | Gyoda | .............. | G02B 27/0025 |

FOREIGN PATENT DOCUMENTS

| | | |
|---|---|---|
| JP | 2015-108814 A | 6/2015 |
| JP | 2015-111254 A | 6/2015 |
| JP | 2015-215560 A1 | 12/2015 |
| JP | 2015-215561 A1 | 12/2015 |
| JP | 2016-051100 A | 4/2016 |
| JP | 2016-148707 A | 8/2016 |
| JP | 2016-161644 A | 9/2016 |

* cited by examiner

OPTICAL SYSTEM AND IMAGE PICKUP APPARATUS INCLUDING THE SAME

BACKGROUND

Field of Art

The present disclosure relates to an optical system and to an image pickup apparatus including the optical system, and is suitable for image pickup apparatuses, such as digital still cameras, video cameras, monitoring cameras, or broadcasting cameras, using image pickup elements, or for image pickup apparatuses, such as cameras using silver-halide photographic films.

Description of the Related Art

As an image taking optical system having a long focal length, a so-called telephoto-type image taking optical system, in which an optical system having positive refractive power is disposed on an object side and an optical system having negative refractive power is disposed on an image side, is known. Such a telephoto-type image taking optical system is used in, for example, a super-telephoto lens having a fixed focal length.

In a super-telephoto lens, in general, as the focal length increases, axial chromatic aberration and chromatic aberration of magnification occur frequently. As a known method of properly correcting such chromatic aberrations, the number of lenses that are disposed on the object side is increased, and operations for correcting such chromatic aberrations are divided among the lenses. However, the effective diameters of the lenses that are disposed on the object side of the super-telephoto lens tend to be large. When such chromatic aberrations are corrected by the above-described method, the image taking optical system tends to become heavy.

In an image taking optical system in Japanese Patent Laid-Open No. 2015-215561, axial chromatic aberration and chromatic aberration of magnification are corrected by successively disposing positive lenses, which are made of a material having low dispersion and anomalous dispersion property, from a most object side.

In the optical system in Japanese Patent Laid-Open No. 2015-215561, chromatic aberrations are corrected by disposing the positive lenses, which are made of a material having low dispersion and anomalous dispersion property, as close as possible to the object side. However, since the effective diameters of such positive lenses become large, the weight of the optical system cannot be sufficiently reduced.

SUMMARY

In order to further reduce the weight of the optical system, it is important to dispose negative lenses, which are made of suitable materials, at proper locations.

The present disclosure provides an optical system that is light and whose aberrations, such as chromatic aberration, are properly corrected, and an image pickup apparatus including the optical system.

An optical system according to a present embodiment comprises a first lens unit having positive refractive power, a second lens unit having positive refractive power or negative refractive power, and a third lens unit having positive refractive power or negative refractive power. The first lens unit, the second lens unit, and the third lens unit are disposed in that order from an object side to an image side. During focusing, the second lens unit moves to change an interval between adjacent lens units. The first lens unit includes a positive lens G1p that is disposed closest to the object side, a positive lens G2p that is disposed adjacent to the image side of the positive lens G1p, and a negative lens G1n that is disposed on the image side of the positive lens G2p and that is disposed closest to the object side among negative lenses that are included in the first lens unit. When a focal length of the optical system is f, a distance along an optical axis from a lens surface of the first lens unit that is closest to the object side to an image plane is LD, a focal length of the positive lens G1p is fG1p, a focal length of the negative lens G1n is fG1n, an Abbe number of a material of the negative lens G1n is vdG1n, a partial dispersion ratio of the material of the negative lens G1n is θgF_G1n, and a distance along the optical axis between the positive lens G1p and the positive lens G2p is D12, the following conditional expressions are satisfied:

$LD/f < 1.0;$ $2.00 < |fG1p/fG1n| < 10.00;$ $20.0 < vdG1n < 40.0;$ $-0.1000 < \theta gF\_G1n - (-1.665 \times 10^{-7} \times vdG1n^3 + 5.213 \times 10^{-5} \times vdG1n^2 - 5.656 \times 10^{-3} \times vdG1n + 0.7268) < -0.0010;$ and $0.13 < D12/LD < 0.50.$ Features of the present invention will become apparent from the following description of exemplary embodiments with reference to the attached drawings.

DESCRIPTION OF THE EMBODIMENTS

Optical systems and an image pickup apparatus including such optical systems according to the present embodiment are described in detail below with reference to the attached drawings. An optical system according to the present embodiment includes a first lens unit having positive refractive power, a second lens unit having positive refractive power or negative refractive power, and a third lens unit having positive refractive power or negative refractive power, which are disposed in that order from an object side to an image side. During focusing, the second lens unit moves to change the interval between adjacent lens units. Here, the term "lens unit" refers to a lens element that moves integrally during focusing. The lens units include one or more lenses. The lens units need not include a plurality of lenses.

FIGS. 1, 3, 5, 7, 9, 11, 13, 15, 17, 19, 21, 23, 25, and 27 are sectional views of optical systems according to corresponding first to fourteenth embodiments. FIGS. 2, 4, 6, 8, 10, 12, 14, 16, 18, 20, 22, 24, 26, and 28 illustrate aberrations of the optical systems according to the corresponding first to fourteenth embodiments when the corresponding optical systems are focused at infinity.

Figure 1:
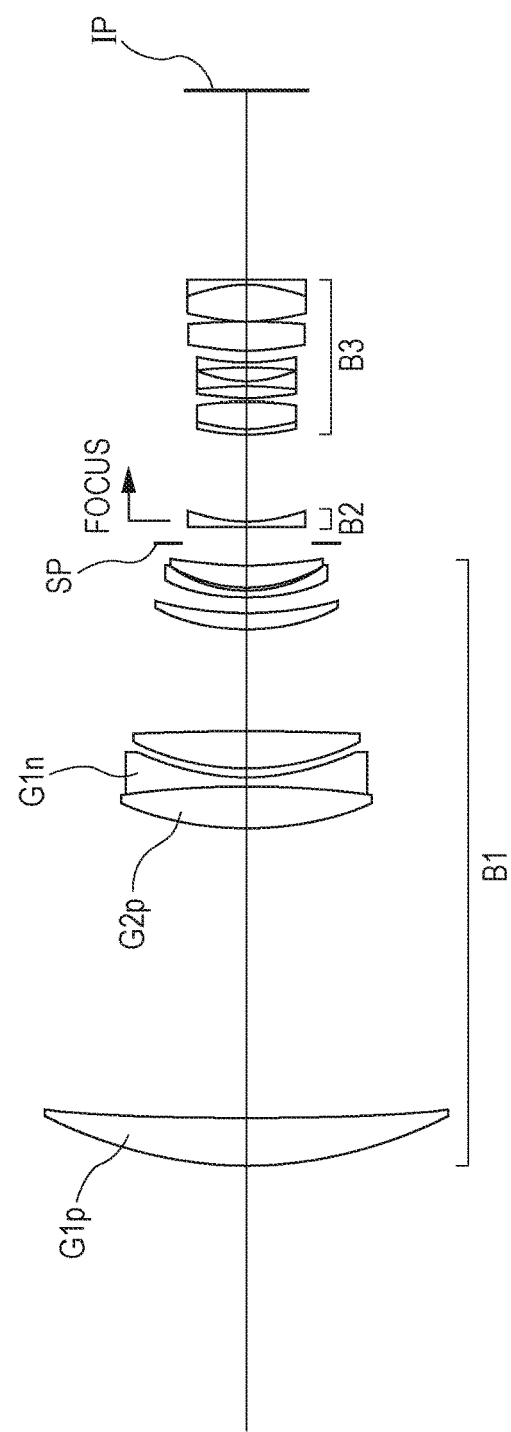
FIG. 1 is a sectional view of lenses of an optical system according to a first embodiment.
Figure 2:
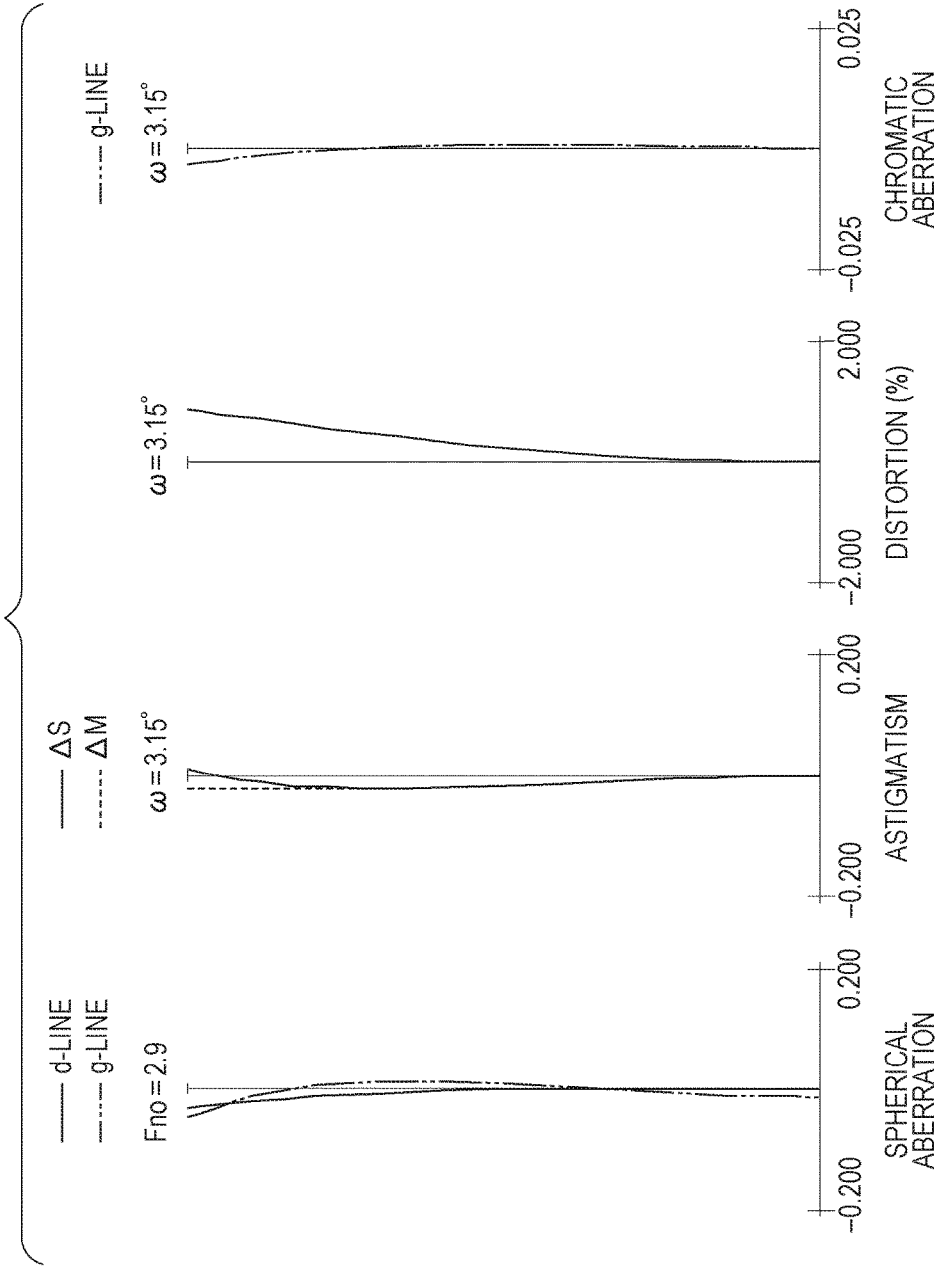
FIG. 2 illustrates aberrations of the optical system according to the first embodiment when the optical system is focused at infinity.
Figure 3:
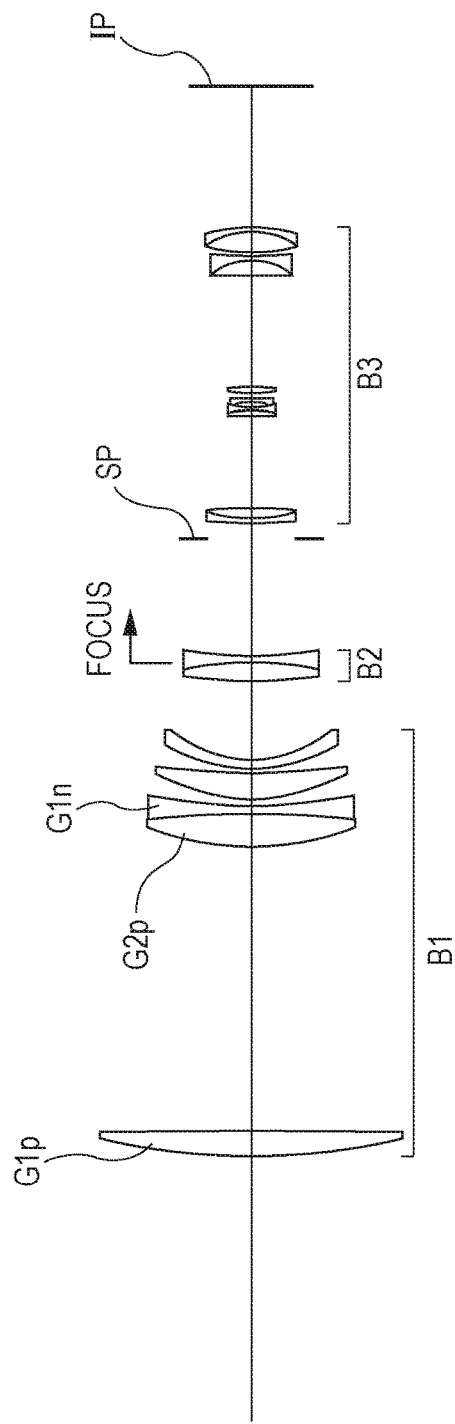
FIG. 3 is a sectional view of lenses of an optical system according to a second embodiment.
Figure 4:
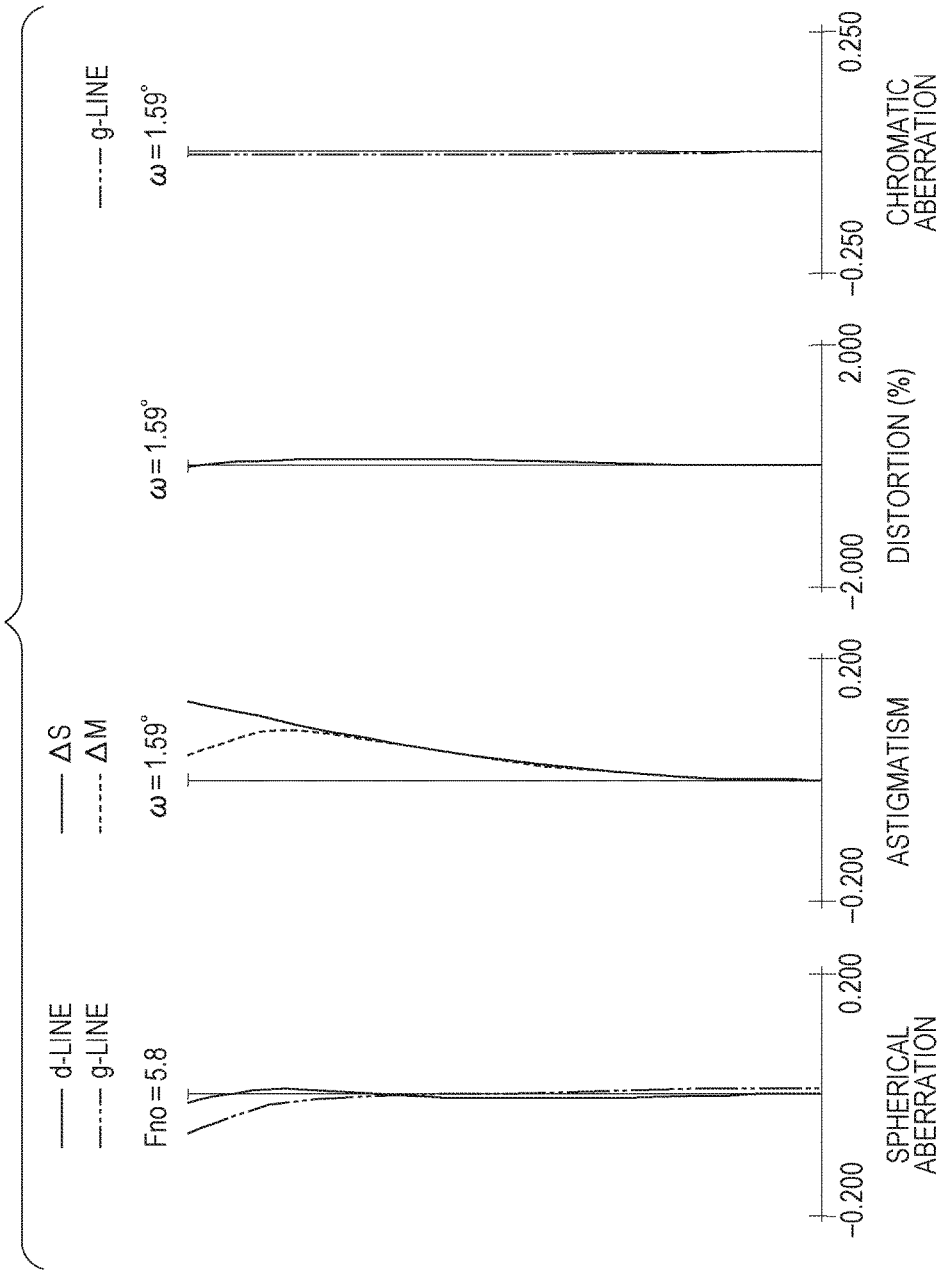
FIG. 4 illustrates aberrations of the optical system according to the second embodiment when the optical system is focused at infinity.
Figure 5:
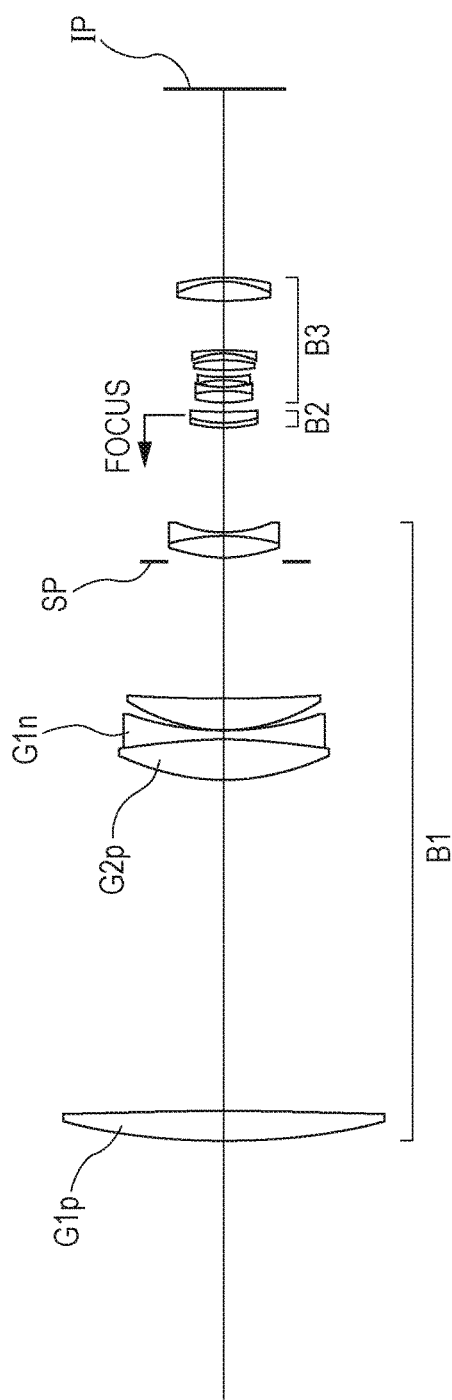
FIG. 5 is a sectional view of lenses of an optical system according to a third embodiment.
Figure 6:
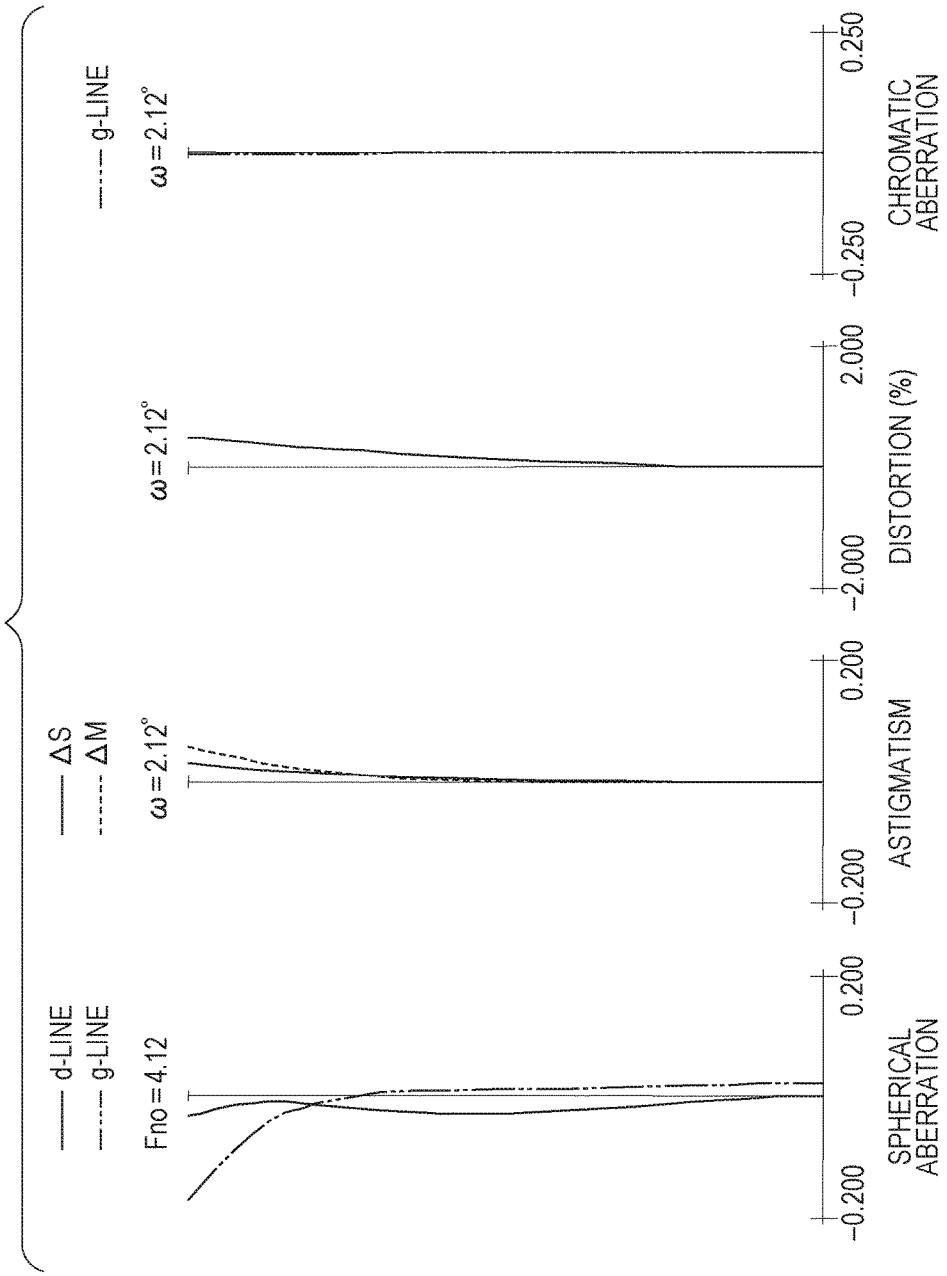
FIG. 6 illustrates aberrations of the optical system according to the third embodiment when the optical system is focused at infinity.
Figure 7:
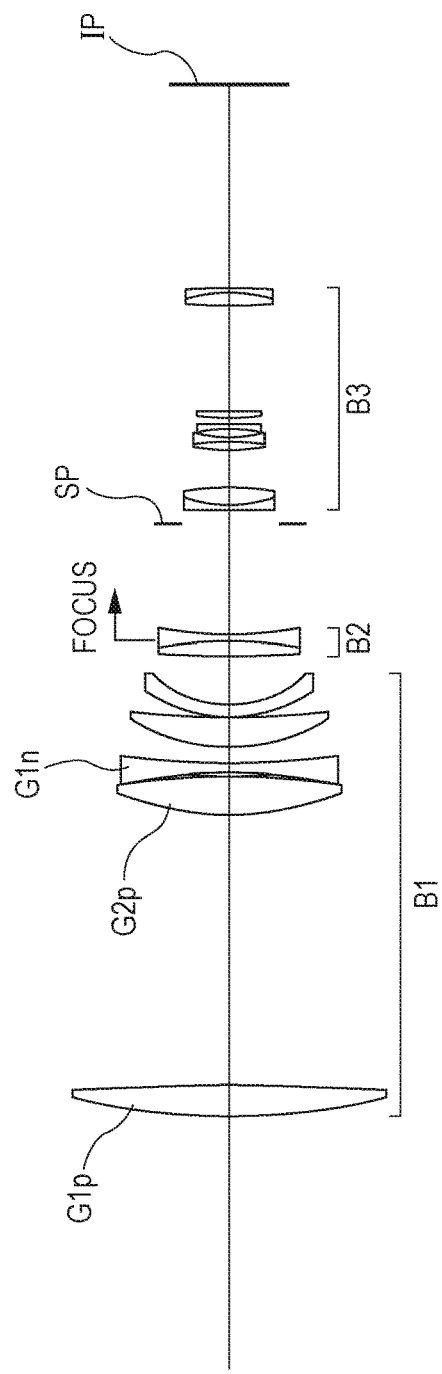
FIG. 7 is a sectional view of lenses of an optical system according to a fourth embodiment.
Figure 8:
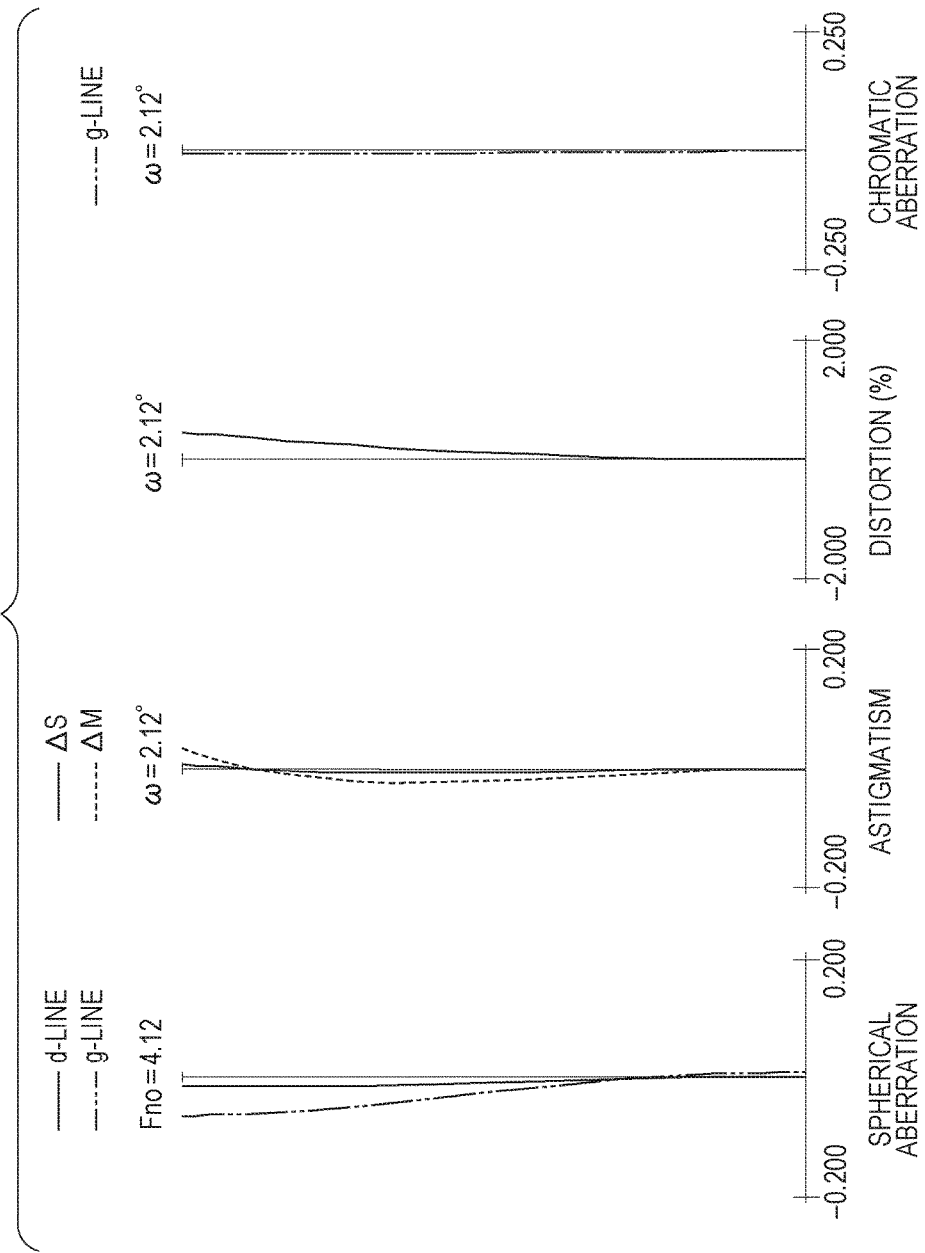
FIG. 8 illustrates aberrations of the optical system according to the fourth embodiment when the optical system is focused at infinity.
Figure 9:
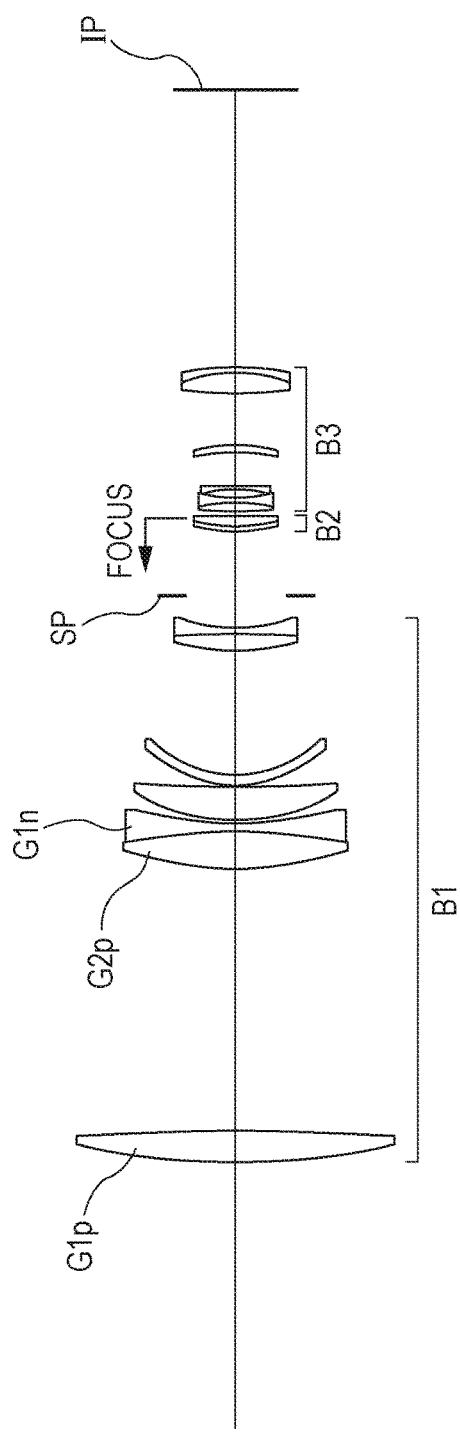
FIG. 9 is a sectional view of lenses of an optical system according to a fifth embodiment.
Figure 10:
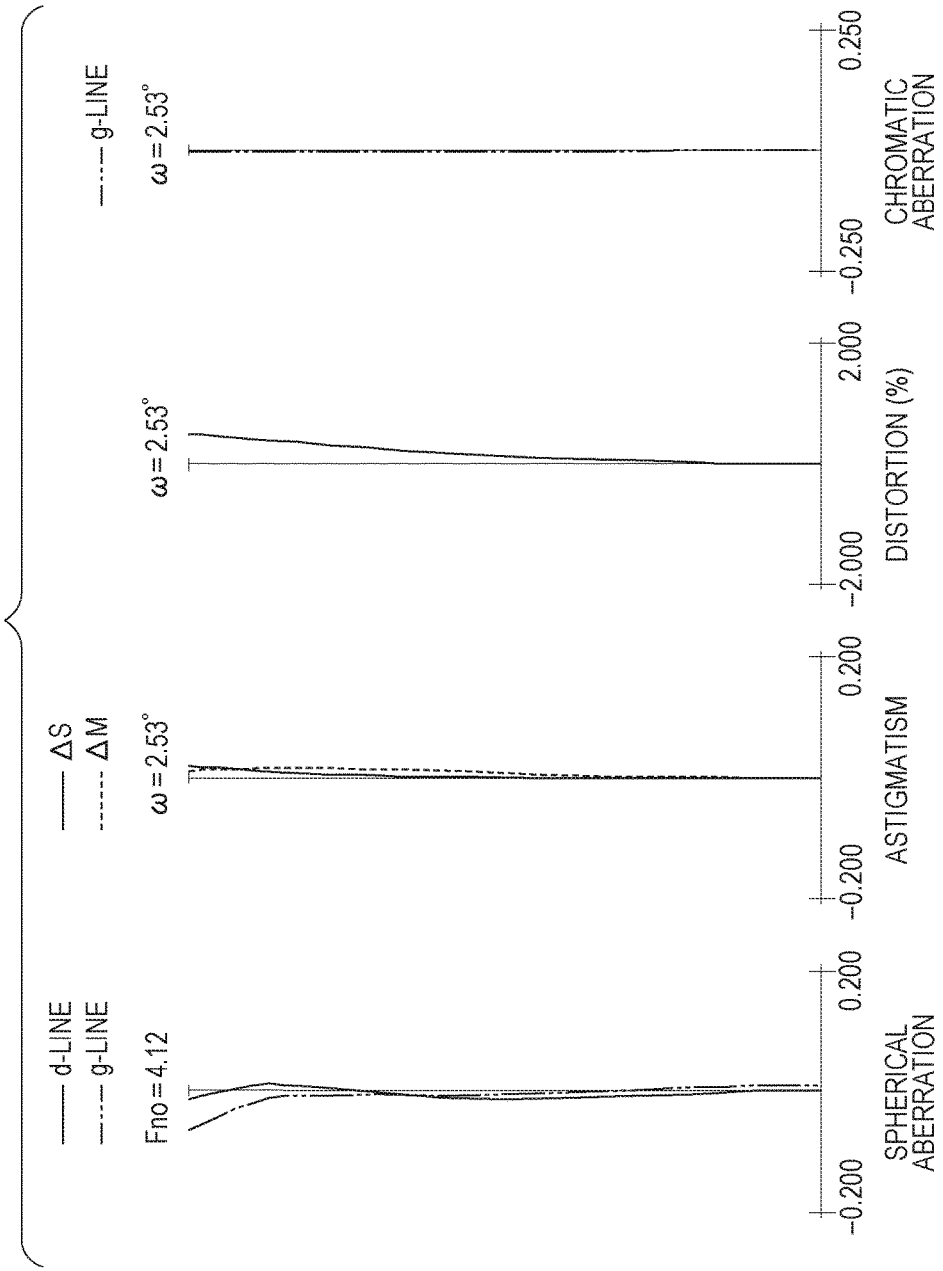
FIG. 10 illustrates aberrations of the optical system according to the fifth embodiment when the optical system is focused at infinity.
Figure 11:
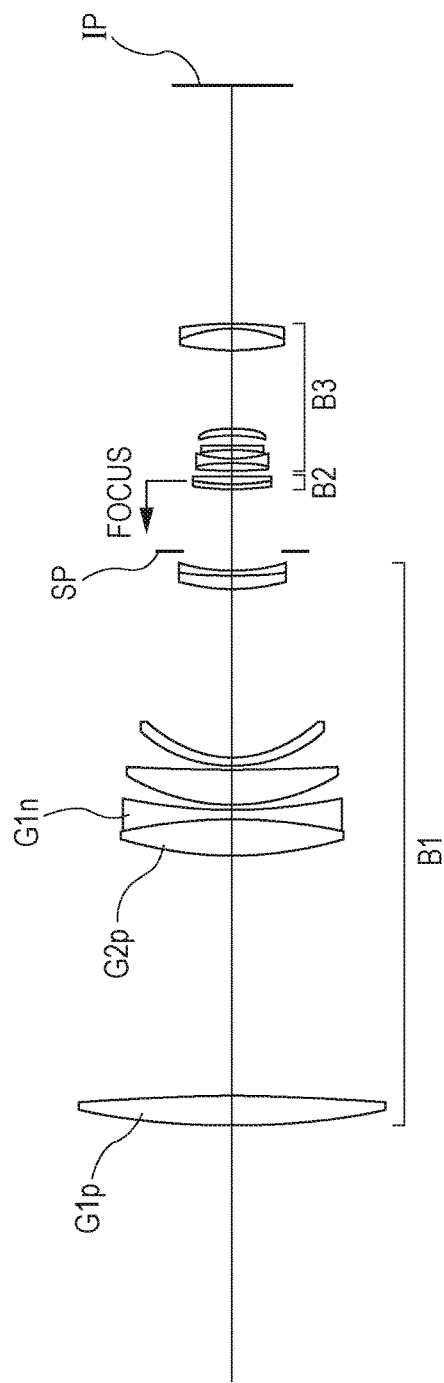
FIG. 11 is a sectional view of lenses of an optical system according to a sixth embodiment.
Figure 12:
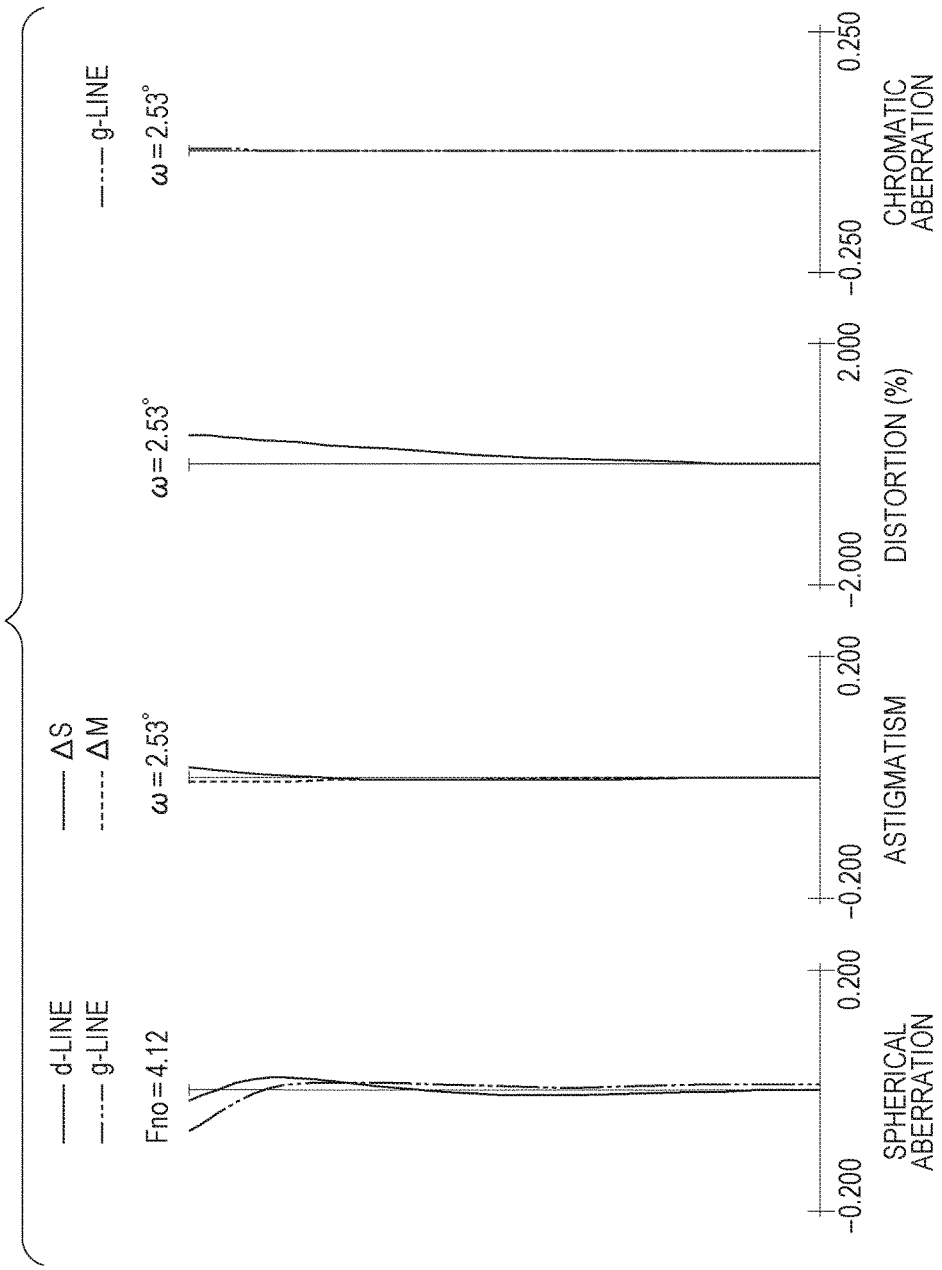
FIG. 12 illustrates aberrations of the optical system according to the sixth embodiment when the optical system is focused at infinity.
Figure 13:
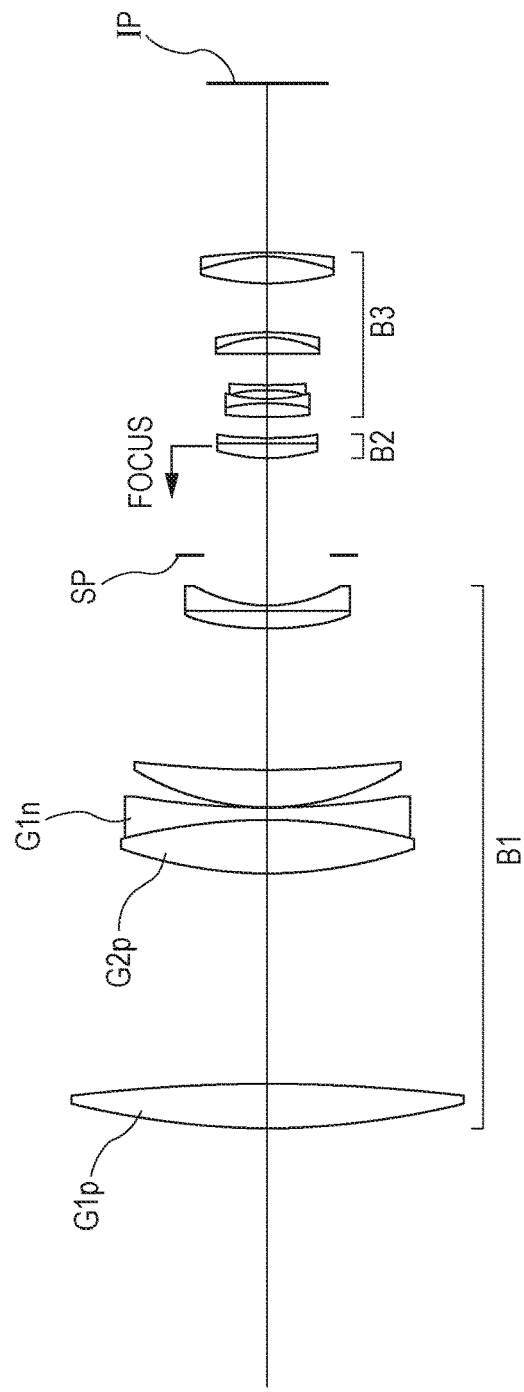
FIG. 13 is a sectional view of lenses of an optical system according to a seventh embodiment.
Figure 14:
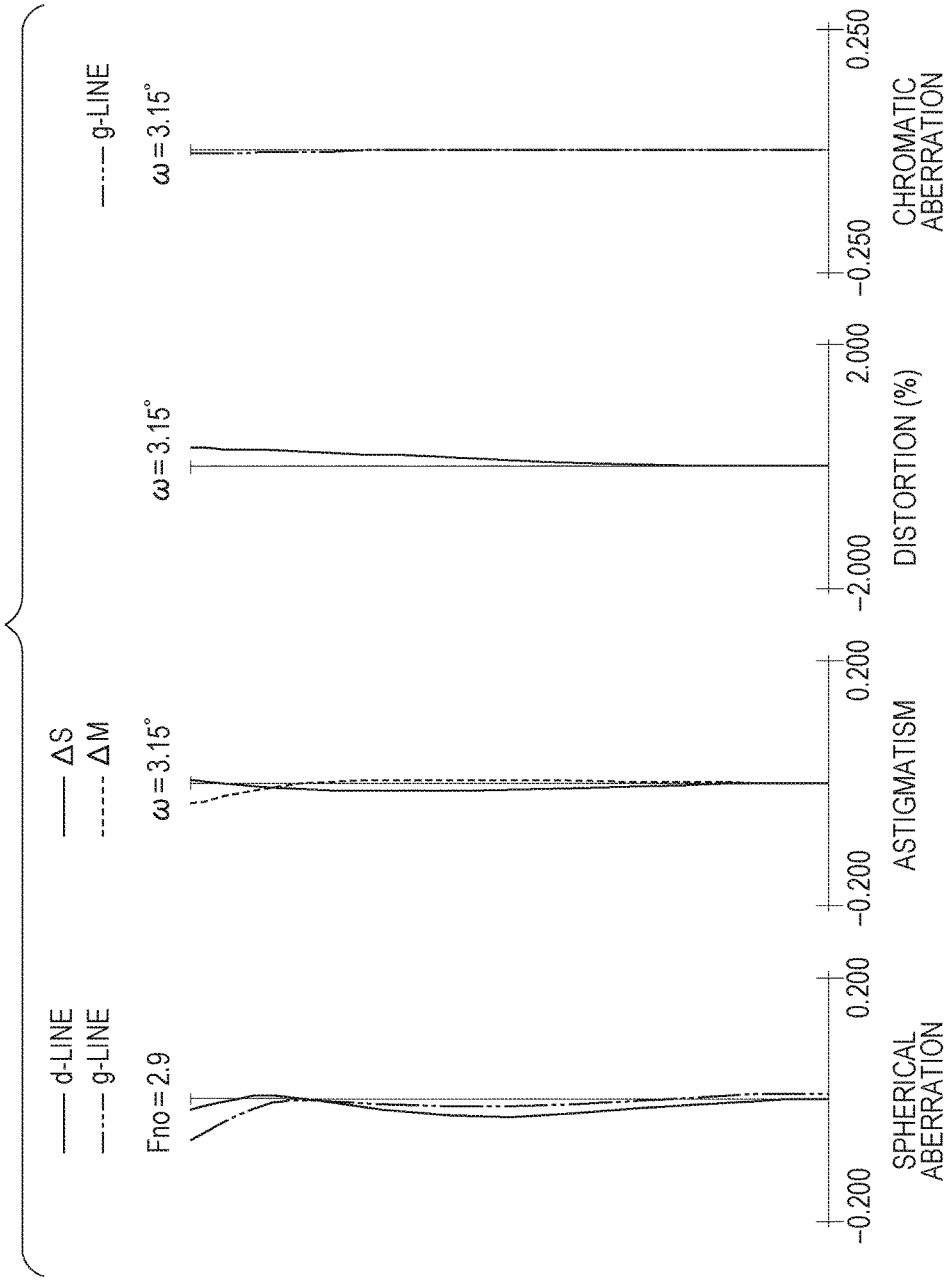
FIG. 14 illustrates aberrations of the optical system according to the seventh embodiment when the optical system is focused at infinity.
Figure 15:
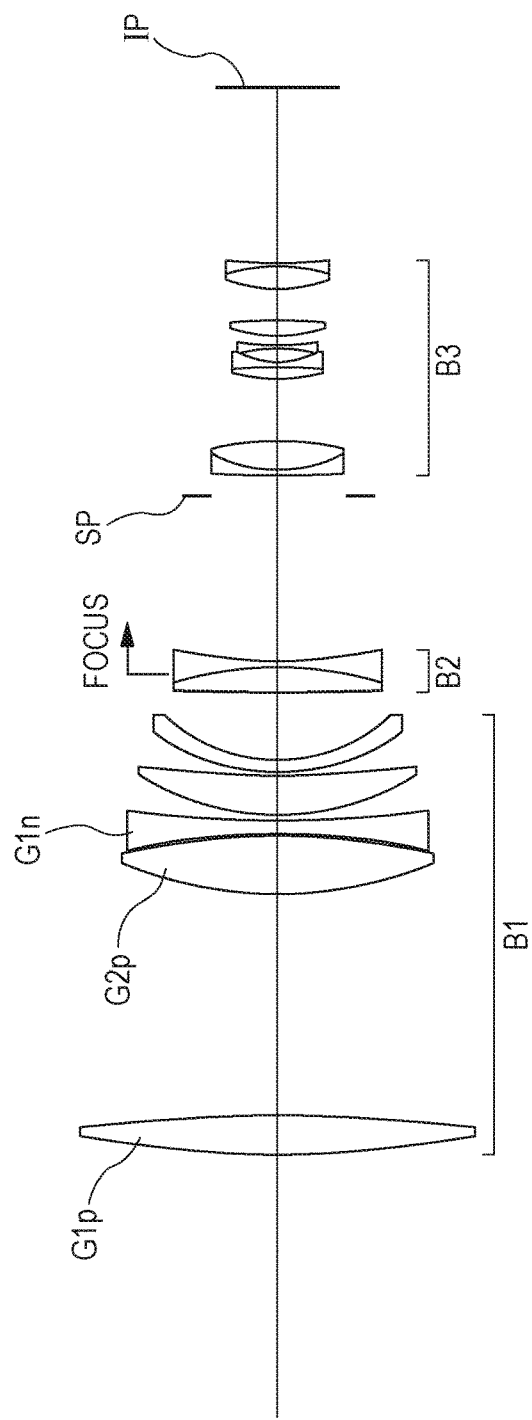
FIG. 15 is a sectional view of lenses of an optical system according to an eighth embodiment.
Figure 16:
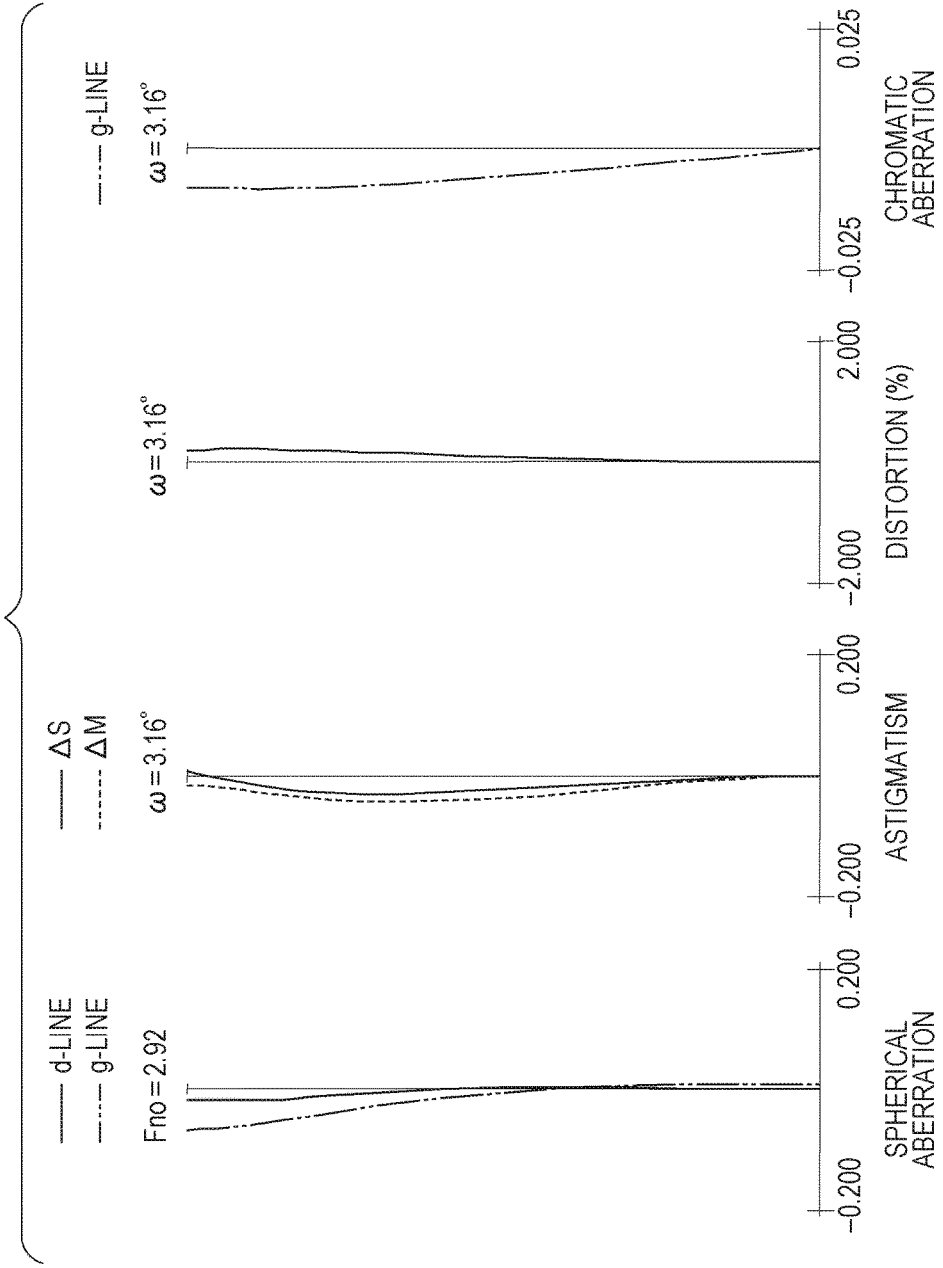
FIG. 16 illustrates aberrations of the optical system according to the eighth embodiment when the optical system is focused at infinity.
Figure 17:
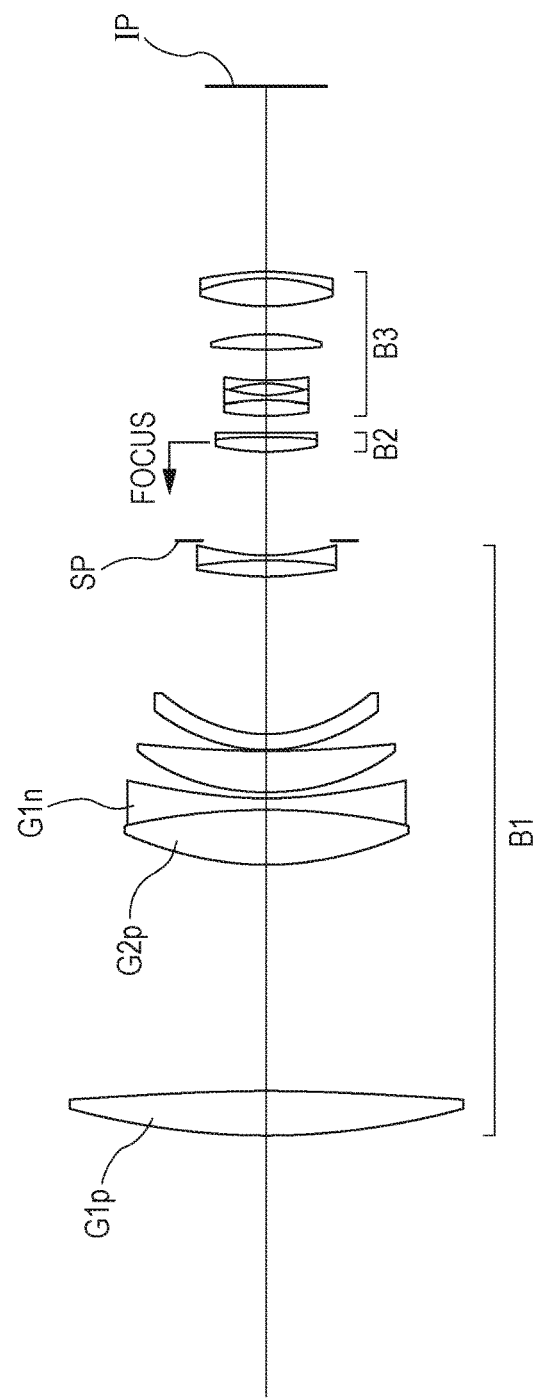
FIG. 17 is a sectional view of lenses of an optical system according to a ninth embodiment.
Figure 18:
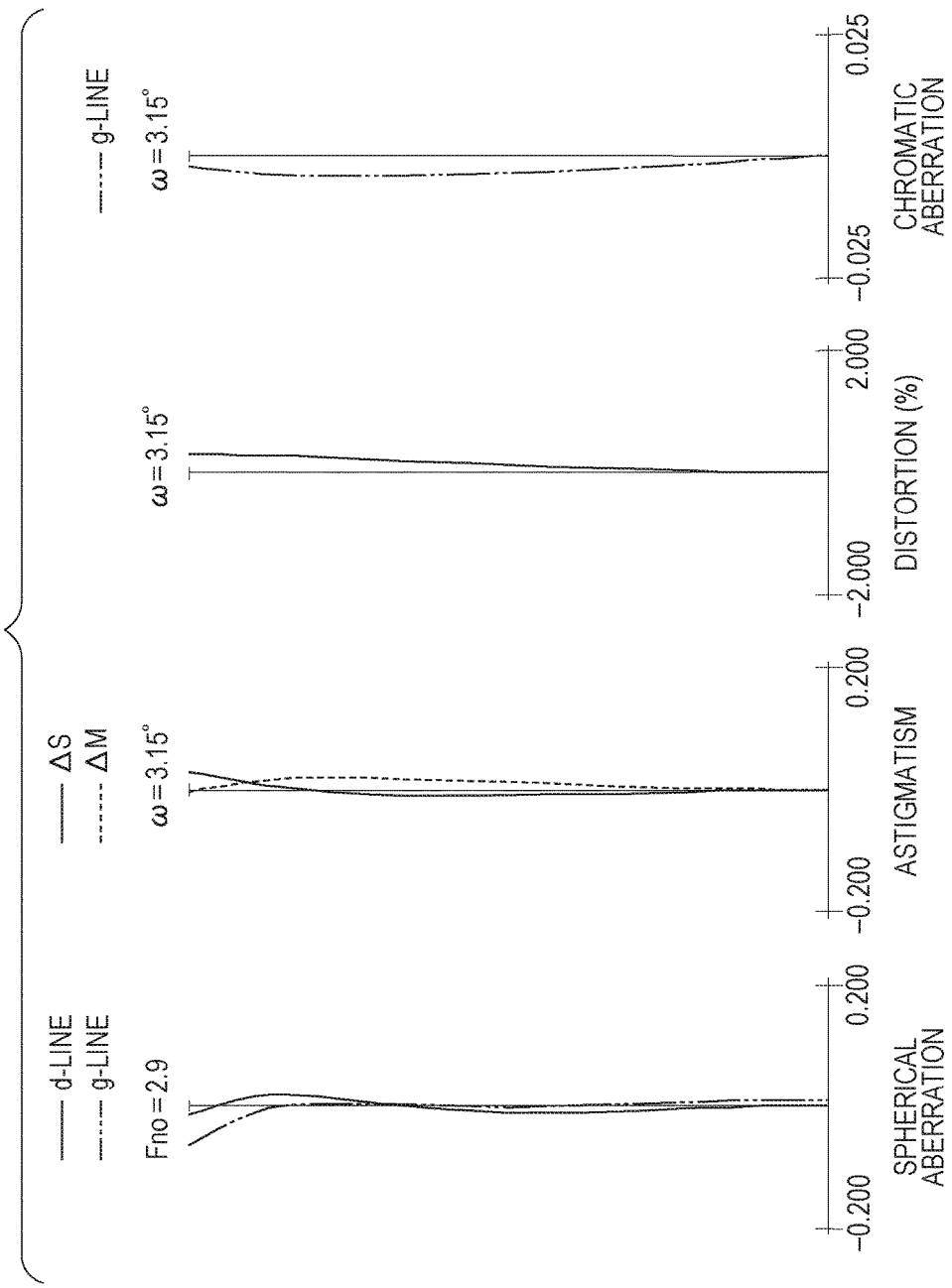
FIG. 18 illustrates aberrations of the optical system according to the ninth embodiment when the optical system is focused at infinity.
Figure 19:
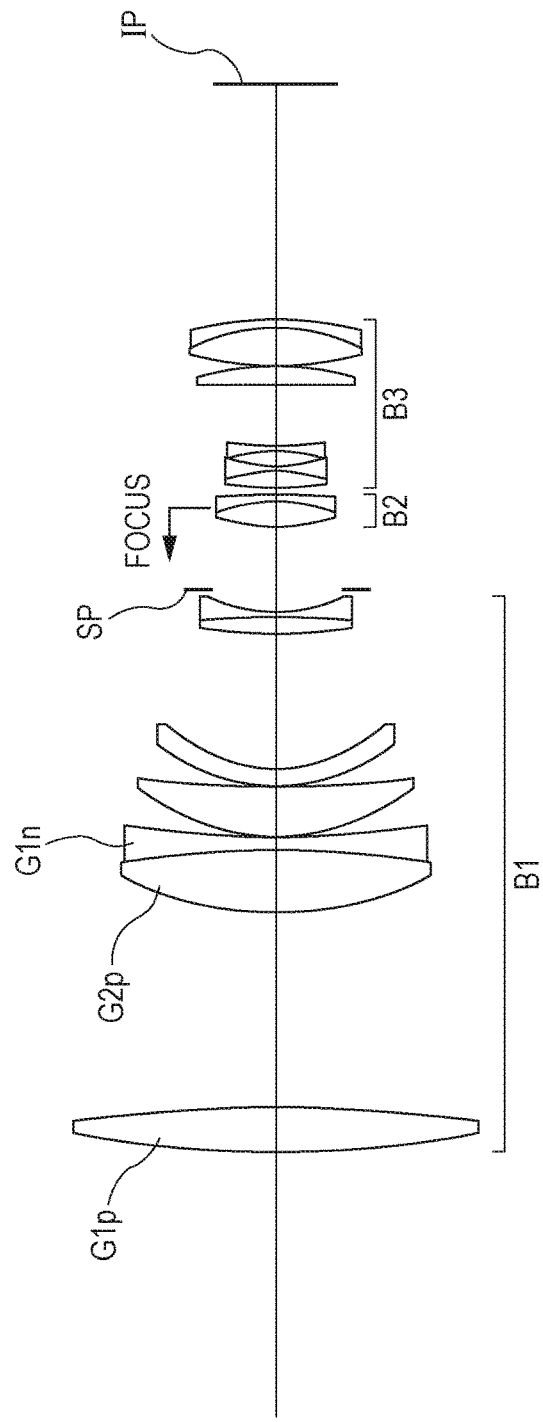
FIG. 19 is a sectional view of lenses of an optical system according to a tenth embodiment.
Figure 20:
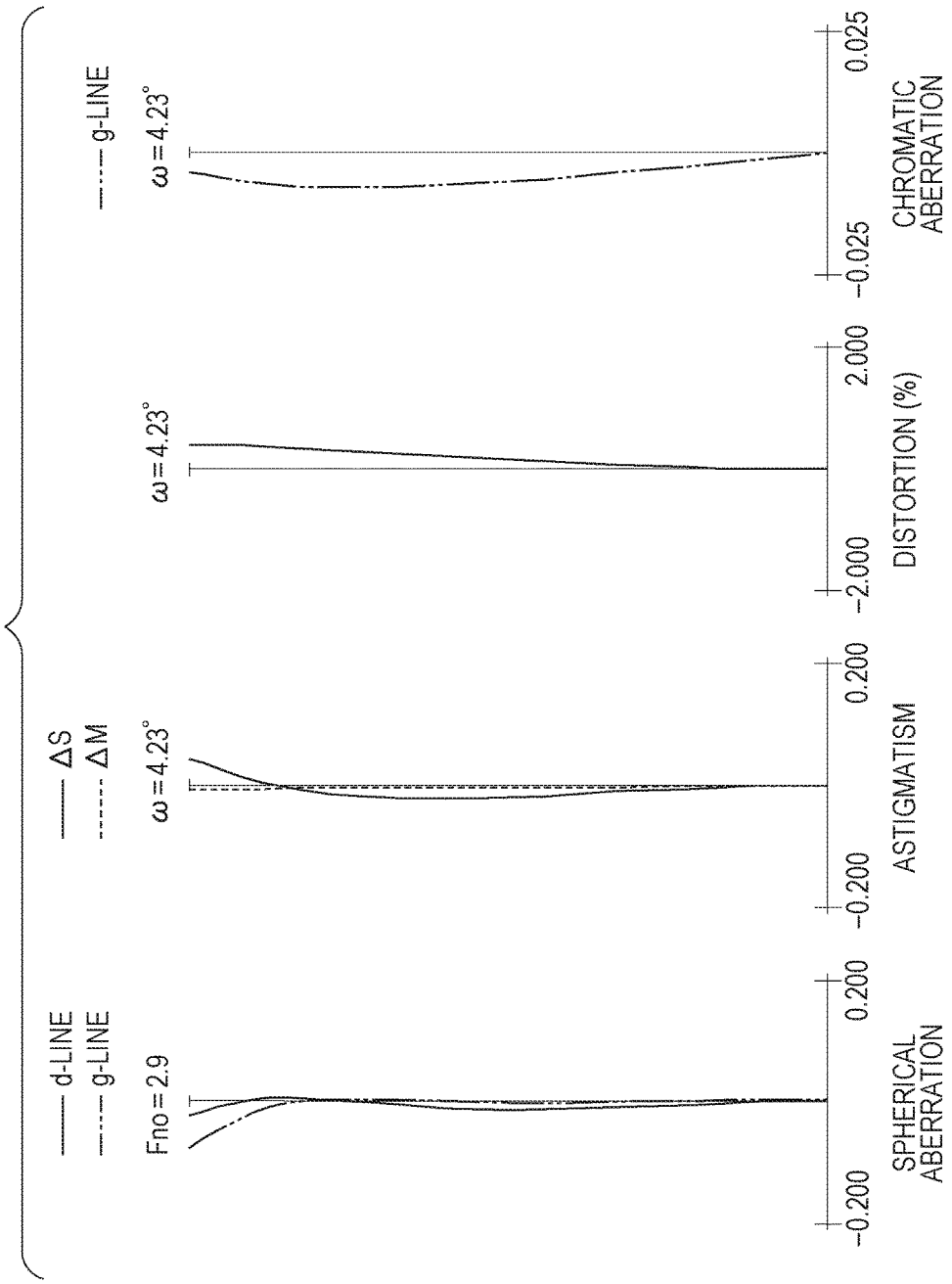
FIG. 20 illustrates aberrations of the optical system according to the tenth embodiment when the optical system is focused at infinity.
Figure 21:
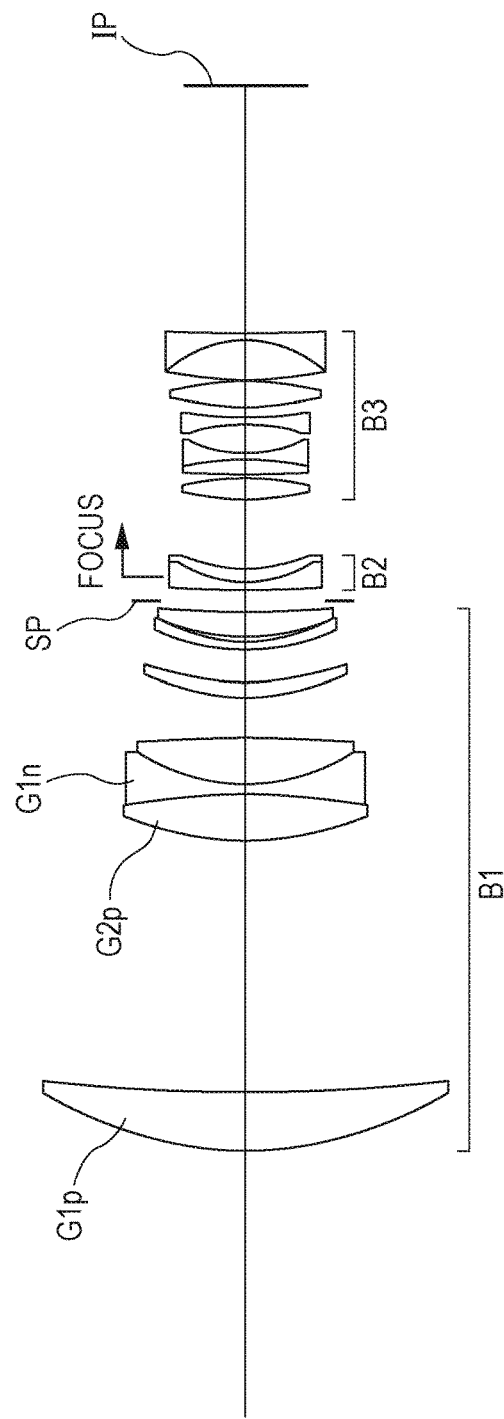
FIG. 21 is a sectional view of lenses of an optical system according to an eleventh embodiment.
Figure 22:
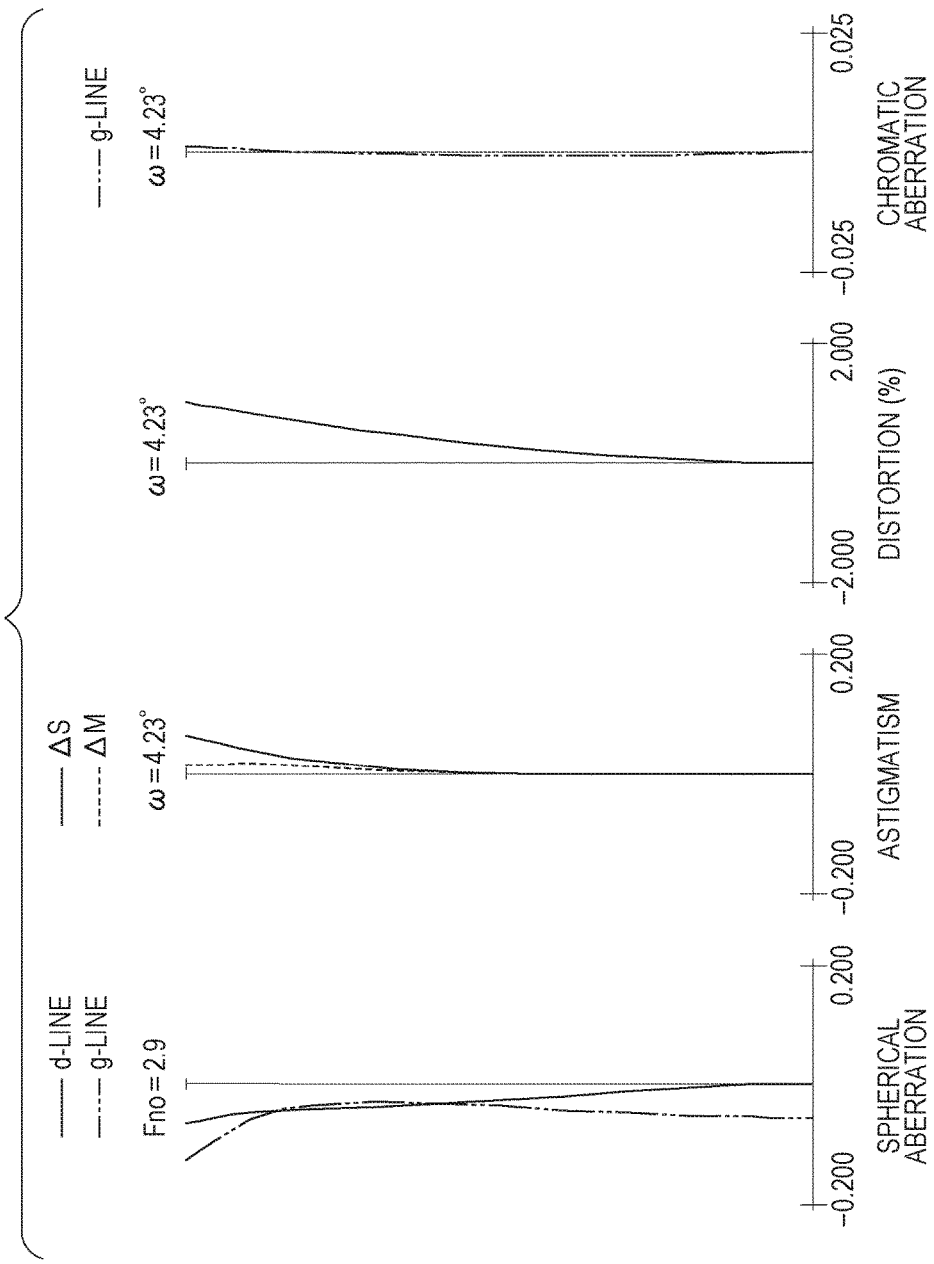
FIG. 22 illustrates aberrations of the optical system according to the eleventh embodiment when the optical system is focused at infinity.
Figure 23:
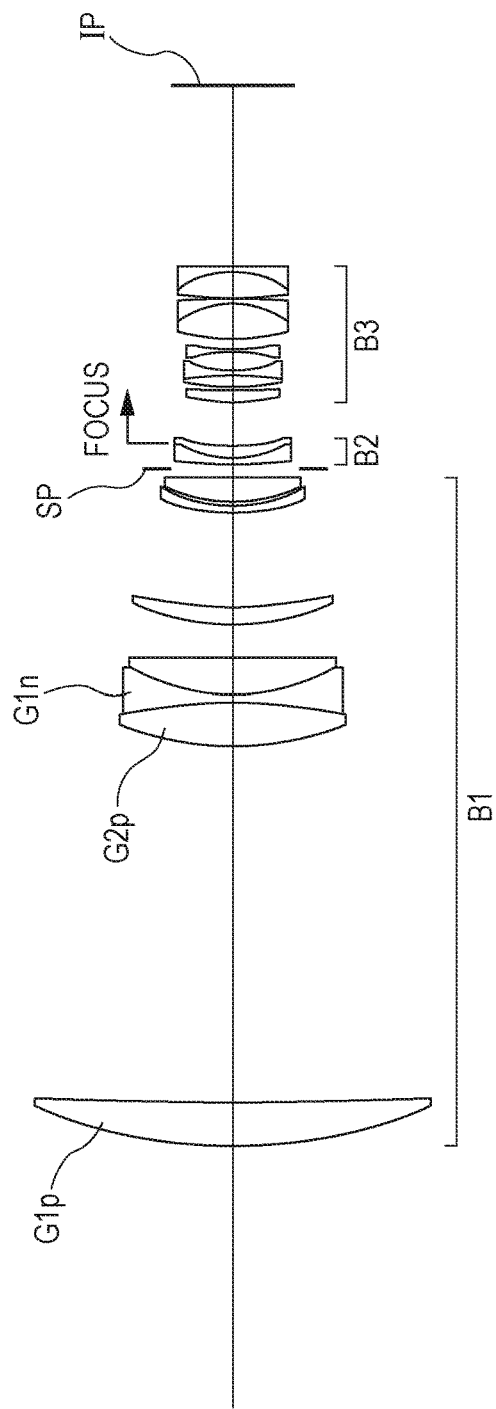
FIG. 23 is a sectional view of lenses of an optical system according to a twelfth embodiment.
Figure 24:
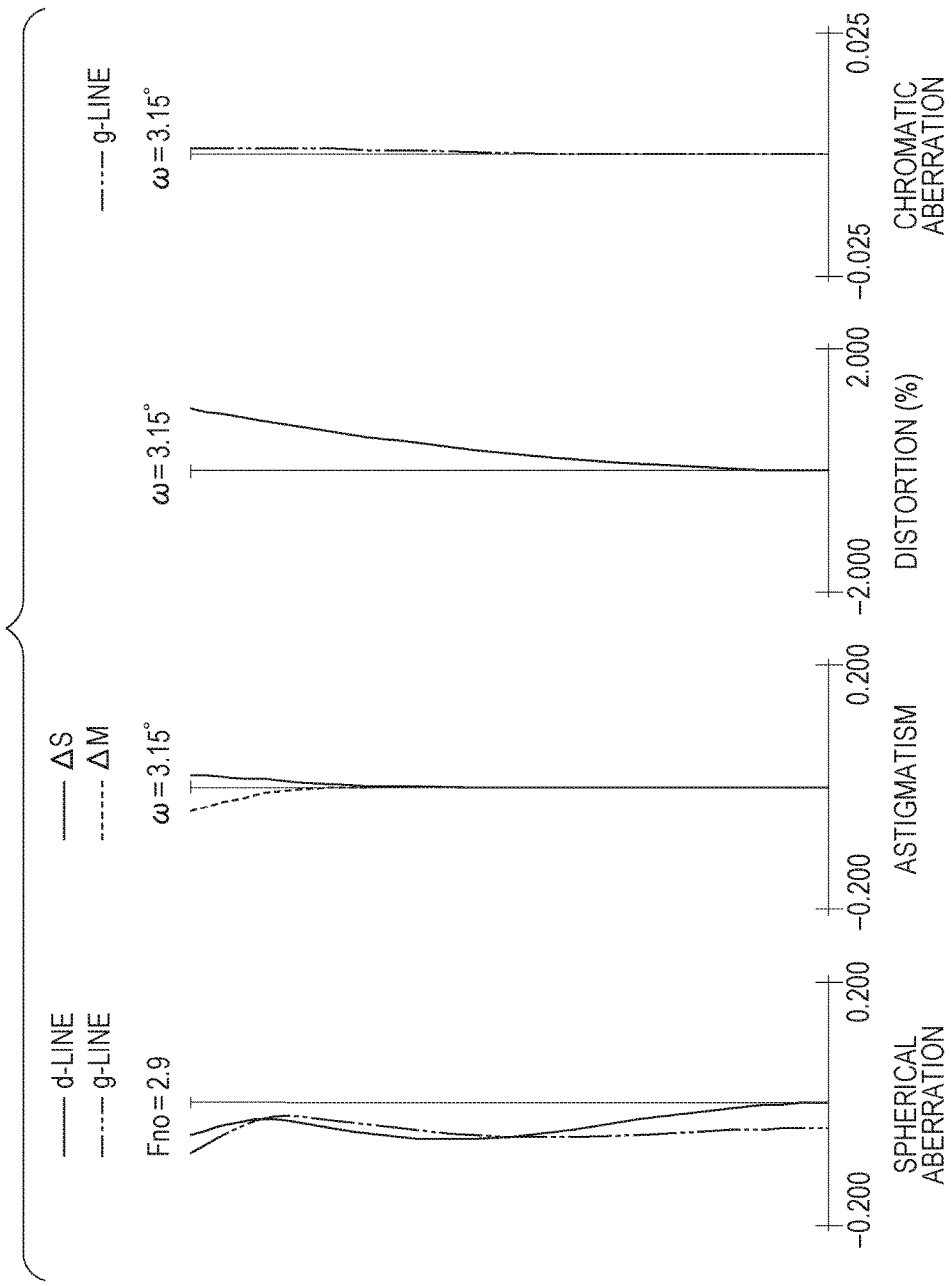
FIG. 24 illustrates aberrations of the optical system according to the twelfth embodiment when the optical system is focused at infinity.
Figure 25:
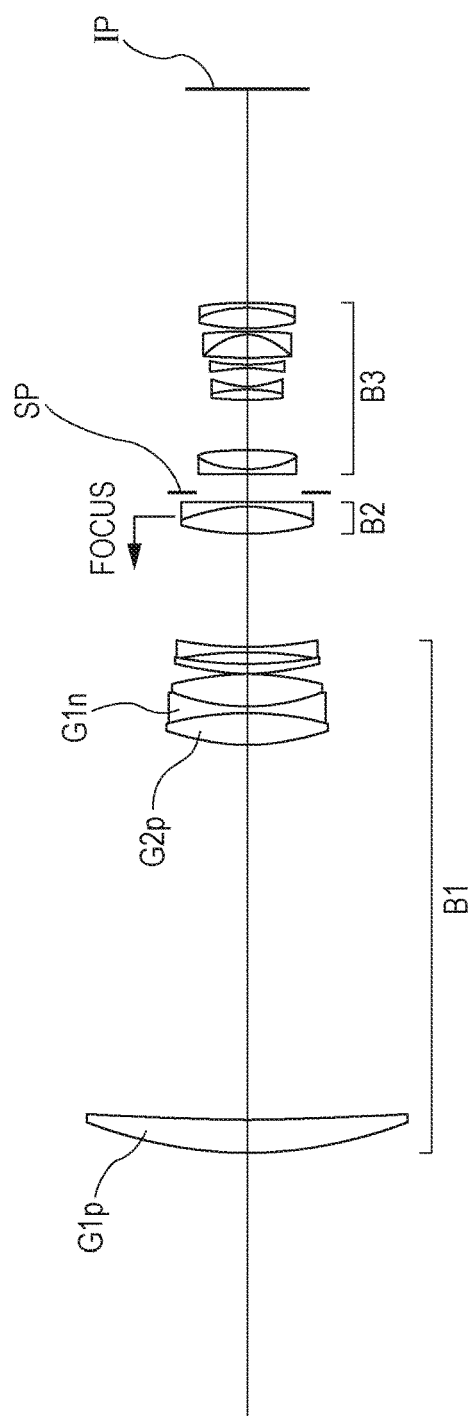
FIG. 25 is a sectional view of lenses of an optical system according to a thirteenth embodiment.
Figure 26:
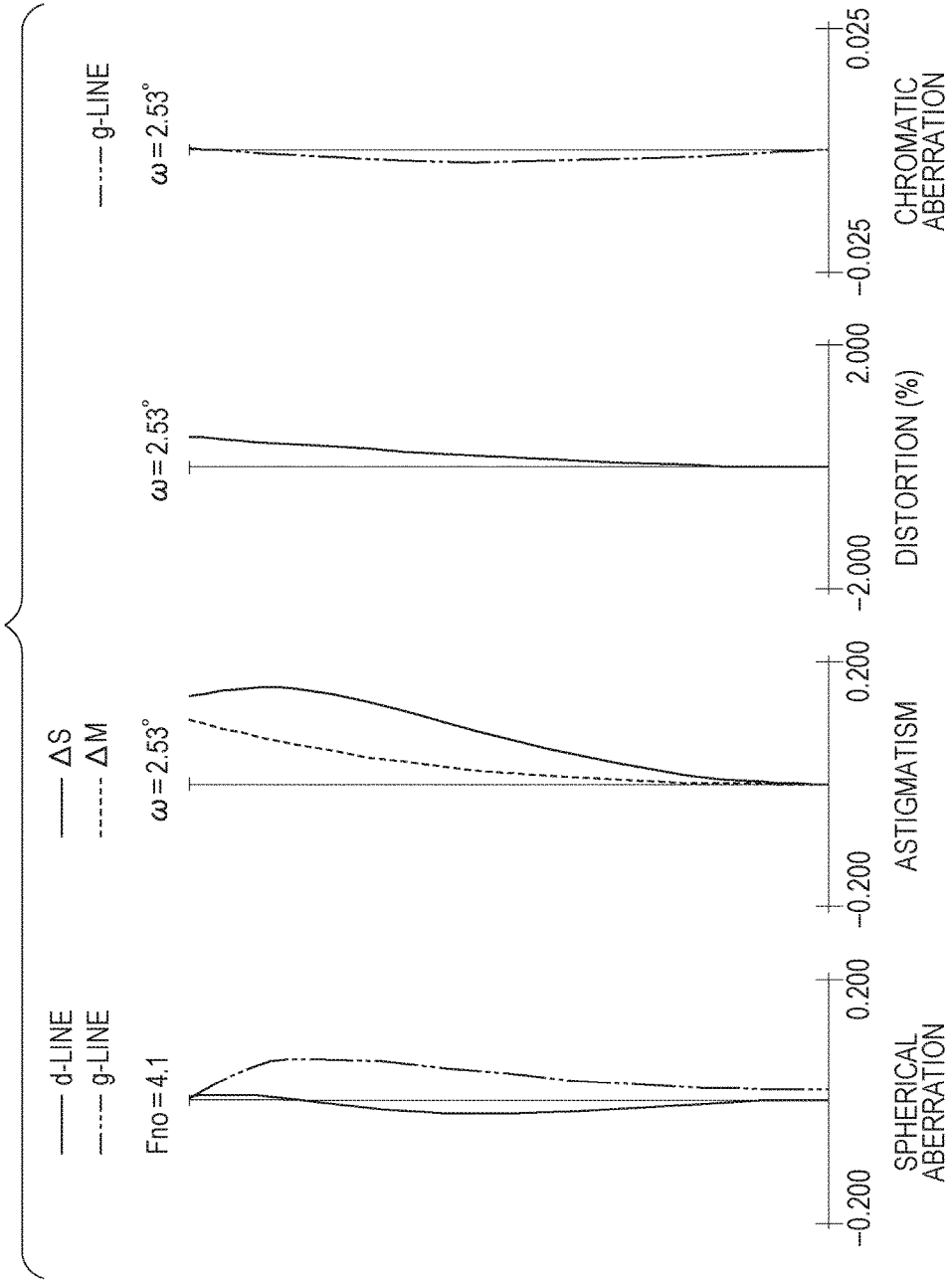
FIG. 26 illustrates aberrations of the optical system according to the thirteenth embodiment when the optical system is focused at infinity.
Figure 27:
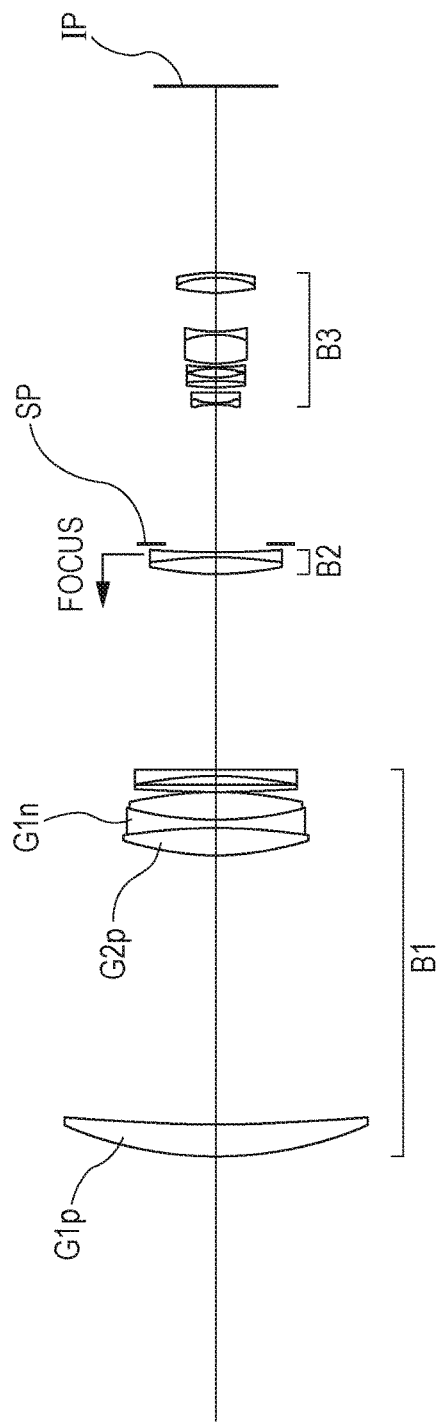
FIG. 27 is a sectional view of lenses of an optical system according to a fourteenth embodiment.
Figure 28:
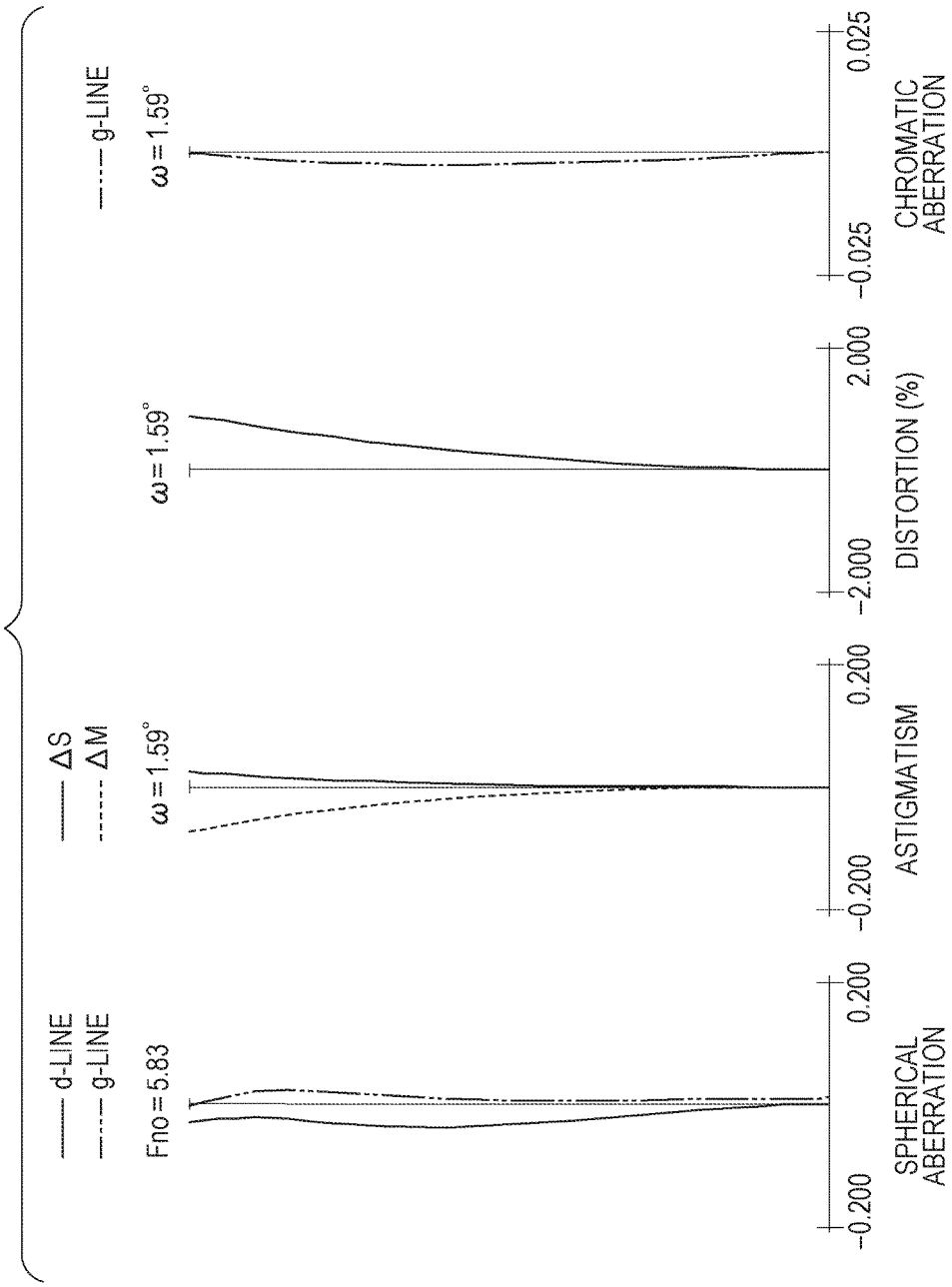
FIG. 28 illustrates aberrations of the optical system according to the fourteenth embodiment when the optical system is focused at infinity.
Figure 29:
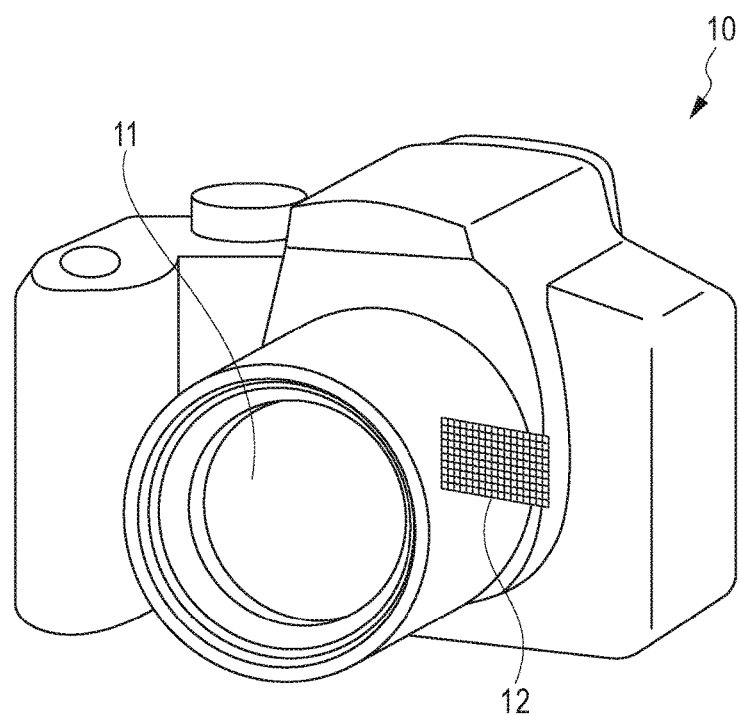
FIG. 29 is a schematic view of a main portion of an image pickup apparatus.

FIG. 29 is a schematic view of a main portion of an image pickup apparatus including an optical system according to the present embodiment. The optical system according to each embodiment is an image taking lens system that is used in an image pickup apparatus, such as a video camera, a digital camera, a silver-halide film camera, or a television camera. In the sectional views of lenses, the left side is the object side (front) and the right side is the image side (rear). In the sectional views of the lenses, Bi denotes an i-th lens unit, where i denotes the order of the lens unit from the object side to the image side.

In each embodiment, SP denotes an aperture stop. In the second embodiment, the fourth embodiment, the eighth embodiment, the thirteenth embodiment, and the fourteenth embodiment, the aperture stop SP is disposed between a second lens unit B2 and a third lens unit B3. In the third embodiment, the aperture stop SP is disposed in a first lens unit B1. In the first embodiment, the fifth embodiment, the sixth embodiment, the seventh embodiment, the ninth embodiment, the tenth embodiment, the eleventh embodiment, and the twelfth embodiment, the aperture stop SP is disposed between the first lens unit B1 and the second lens unit B2.

The optical systems according to the first embodiment, the eleventh embodiment, and the twelfth embodiment each include a first lens unit having positive refractive power, a second lens unit having negative refractive power, and a third lens unit having positive refractive power, which are disposed in that order from the object side to the image side. The optical systems according to the second embodiment, the fourth embodiment, and the eighth embodiment each include a first lens unit having positive refractive power, a second lens unit having negative refractive power, and a third lens unit having negative refractive power, which are disposed in that order from the object side to the image side. The optical systems according to the third embodiment, the fifth embodiment, the sixth embodiment, the tenth embodiment, the thirteenth embodiment, and the fourteenth embodiment each include a first lens unit having positive refractive power, a second lens unit having positive refractive power, and a third lens unit having negative refractive power, which are disposed in that order from the object side to the image side. The optical systems according to the seventh and ninth embodiments each include a first lens unit having positive refractive power, a second lens unit having positive refractive power, and a third lens unit having positive refractive power.

Symbol IP denotes an image plane. When an optical system is used as an image pickup optical system of a video camera or a digital camera, the image plane IP corresponds to a solid-state image pickup element (photoelectric conversion element), such as a CCD sensor and a CMOS sensor. When the optical system according to the present embodiment is used as an image pickup optical system of a silver-halide film camera, the image plane corresponds to a film plane.

In the diagrams illustrating spherical aberration, Fno denotes an F-number, and indicates spherical aberration with respect to a d-line (wavelength: 587.6 nm) and a g-line (wavelength: 435.8 nm). In the diagrams illustrating astigmatism, $\Delta S$ denotes the amount of astigmatism in a sagittal image plane, and $\Delta M$ denotes the amount of astigmatism in a meridional image plane. Distortion aberration is indicated with respect to a d-line. In the diagrams illustrating chromatic aberration, chromatic aberration at a g-line is illustrated. $\omega$ denotes an image-pickup half angle of view.

In each embodiment, as indicated by an arrow in each of the sectional views of the lenses, in focusing from a point at infinity up to a close distance, the second lens unit B2 moves to change the interval between adjacent lens units. In the optical system according to each of the embodiments, the second lens unit B2 corresponds to a focusing unit. In the first embodiment, the second embodiment, the fourth embodiment, the eighth embodiment, the eleventh embodiment, and the twelfth embodiment, in focusing from a point at infinity to a close distance, the second lens unit B2 moves to the image side. In the third embodiment, the fifth to seventh embodiments, the ninth embodiment, the tenth embodiment, the thirteenth embodiment, and the fourteenth embodiment, in focusing from a point at infinity to a close distance, the second lens unit B2 moves to the object side.

In the optical system according to each embodiment, some of the lenses of the optical system may constitute an image stabilizing unit, in which case, by moving the image stabilizing unit in a direction including a component in a direction perpendicular to an optical axis of the optical system, a focus position can be changed. This makes it possible to correct image blurring. Any of the first lens unit B1, the second lens unit B2, and the third lens unit B3 may serve as the image stabilizing unit; or some of the lenses of a particular lens unit may serve as the image stabilizing unit.

In the present embodiment, chromatic aberration is properly corrected by forming negative lenses included in the first lens unit B1 out of a material having high dispersion and high anomalous dispersion property. In an existing super-telephoto lens, the amount of generation of chromatic aberration is reduced by using a proper material for positive lenses included in the first lens unit B1. Therefore, the effect of correcting chromatic aberration by the negative lenses included in the first lens unit B1 is not sufficient. In the present embodiment, by increasing the effect of correcting chromatic aberration by the negative lenses included in the first lens unit B1, the generation of chromatic aberration at the positive lenses included in the first lens unit B1 is allowed.

By correcting chromatic aberrations in a well balanced manner by lenses that are included in the first lens unit B1, it is possible to reduce the weight of the optical system including the first lens unit B1 and to correct chromatic aberrations.

Here, as parameters related to correcting chromatic aberrations in the optical system, an Abbe number $vd$ and a partial dispersion ratio $\theta gF$ are known. When the refractive indices of a material with respect to a g-line (wavelength: 435.8 nm), an F-line (486.1 nm), a C-line (wavelength: 656.3 nm), and a d-line (wavelength: 587.6 nm) are Ng, NF, NC, and Nd, the Abbe number $vd$ and the partial dispersion ratio $\theta gF$ are expressed as follows:

$$vd=(Nd-1)/(NF-NC)$$

$$\theta gF=(Ng-NF)/(NF-NC)$$

In general, by using a material having high dispersion as the material of the negative lenses in the lens unit having positive refractive power as a whole, it is possible to provide the effect of correcting first-order chromatic aberration. In addition, by using a material having high anomalous dispersion property as the material of the negative lenses in the lens unit having positive refractive power as a whole, it is possible to properly correct second-order chromatic aberration of magnification.

Here, the anomalous dispersion property of materials used for the lenses is described. When $$\Delta\theta gF=\theta gF-(-1.665\times10^{-7}\times vd^3+5.213\times10^{-5}\times vd^2-5.656\times10^{-3}\times vd+0.7268) \quad (A)$$

the numerical value of Formula (A) becomes a value close to zero for many materials. As the numerical value of Formula (A) moves away from zero, the material becomes a material having higher anomalous dispersion property.

In the following conditional expressions, the focal length of the entire optical system is f, the distance along an optical axis of the optical system from a lens surface of the first lens unit B1 that is disposed closest to the object side to the image plane (hereunder referred to as the "overall lens length") is LD, and the focal length of a positive lens G1p that is disposed closest to the object side among the positive lenses included in the first lens unit B1 is fG1p. In addition, the focal length of a negative lens G1n that is disposed closest to the object side among the negative lenses included in the first lens unit B1 is fG1n, the Abbe number of the material of the negative lens G1n is vdG1n, the partial dispersion ratio of the material of the negative lens G1n is $\theta gF\_G1n$, and the distance along the optical axis between the positive lens G1p and the positive lens G2p that is adjacent to the image side of the positive lens G1p is D12. In an alternative embodiment, the negative lens G1n may be also be disposed on the image side of positive lens G2p. In such a case, the optical system according to each embodiment satisfies the following conditional expressions:

$$LD/f<1.0 \quad (1)$$

$$2.00<|fG1p/fG1n|<10.00 \quad (2)$$

$$20.0<vdG1n<40.0 \quad (3)$$

$$-0.1000<\theta gF\_G1n-(-1.665\times10^{-7}\times vdG1n^3+5.213\times10^{-5}\times vdG1n^2-5.656\times10^{-3}\times vdG1n+0.7268)<-0.0010 \quad (4)$$

$$0.13<D12/LD<0.50 \quad (5)$$

Conditional Expression (1) shows that the overall lens length LD is less than the focal length f of the entire optical system. In general, the optical system installed in a telephoto lens and whose overall lens length is small has a focal length that is larger than the overall lens length. When LD/f becomes greater than the upper limit of Conditional Expression (1) and the overall lens length LD is increased, the optical system becomes large in an optical axis direction. Therefore, this is not desirable.

Conditional Expression (2) is a conditional expression that prescribes the ratio between the focal length fG1p of the positive lens G1p and the focal length fG1n of the negative lens G1n. When |fG1p/fG1n| becomes less than the lower limit of Conditional Expression (2) and the focal length fG1p of the positive lens G1p becomes small, the refractive power of the positive lens G1p becomes too strong, and axial chromatic aberration occurs frequently at the positive lens G1p. Therefore, this is not desirable. In order to correct axial chromatic aberration that occurs at the positive lens G1p by negative lenses included in the first lens unit B1, it is necessary to increase the number of negative lenses, as a result of which the weight of the optical system is increased. Therefore, this is not desirable.

When |fG1p/fG1n| becomes greater than the upper limit of Conditional Expression (2) and the focal length fG1p of the positive lens G1p becomes large, the refractive power of the positive lens G1p becomes too weak. As a result, light at the positive lens G1p cannot be sufficiently converged, and the effective diameter of a lens disposed on the image side of the positive lens G1p becomes large, thereby increasing the weight of the optical system. Therefore, this is not desirable.

Conditional Expression (3) is a conditional expression that prescribes the Abbe number vdG1n of the material of the negative lens G1n. By using a material having high dispersion as the material of the negative lens G1n included in the first lens unit B1 having positive refractive power, it is possible to properly correct first-order chromatic aberration. When vdG1n becomes less than the lower limit of Conditional Expression (3), chromatic aberration of magnification is excessively corrected at the negative lens G1n. Therefore, this is not desirable. When vdG1n becomes greater than the upper limit of Conditional Expression (3), it becomes difficult to sufficiently correct chromatic aberration of magnification at the negative lens G1n. Therefore, this is not desirable.

Conditional Expression (4) is a conditional expression that prescribes the anomalous dispersion property $\theta gF\_G1n$ of the material of the negative lens G1n. By forming the negative lens G1n out of a material having high anomalous dispersion property, it is possible to correct second-order chromatic aberration of magnification more effectively. A material having a numerical value that is less than the lower limit of Conditional Expression (4) is of little practical use as an image taking optical system. When a material having a numerical value that is greater than the upper limit of Conditional Expression (4) is used as the material of the negative lens G1n, it is difficult to sufficiently correct second-order chromatic aberration of magnification. Therefore, this is not desirable.

Conditional Expression (5) is a conditional expression that prescribes the ratio between the distance D12 along the optical axis between the positive lens G1p and the positive lens G2p adjacent to the image side of the positive lens G1p and the overall lens length LD. When D12/LD becomes less than the lower limit of Conditional Expression (5) and the distance D12 between the positive lens G1p and the positive lens G2p becomes small, the effective diameter of the positive lens G2p becomes large, as a result of which the weight of the positive lens G2p is increased. Therefore, this is not desirable. When D12/LD becomes greater than the upper limit of Conditional Expression (5) and the distance D12 between the positive lens G1p and the positive lens G2p becomes large, it becomes difficult to correct spherical aberration and chromatic aberration that occur at the positive lens G1p by the positive lens G2p or a subsequent lens. Therefore, this is not desirable.

Two positive lenses are consecutively disposed from the most object side of the optical system by disposing the positive lens G2p adjacent to the image side of the positive lens G1p. This makes it possible to considerably converge a light ray passing through the lenses, as a result of which the effective diameters of the lenses that are disposed closer to the image side than the positive lens G2p is can be reduced. Therefore, it is possible to further reduce the weight of the entire optical system.

In each of the embodiments, as described above, each element is properly set so as to satisfy Conditional Expressions (1) to (5). This makes it possible to provide a light optical system whose aberrations, such as chromatic aberrations, are properly corrected.

In each of the embodiments, it is desirable to set the numerical ranges of Conditional Expressions (1) to (5) as follows:

$$LD/f<0.98 \tag{1a}$$

$$2.02<|fG1p/fG1n|<8.00 \tag{2a}$$

$$21.0<vdG1n<39.0 \tag{3a}$$

$$-0.0300<\theta gF\_G1n-(-1.665\times10^{-7}\times vdG1n^3+5.213\times 10^{-5}\times vdG1n^2-5.656\times10^{-3}\times vdG1n+0.7268)<-0.0015 \tag{4a}$$

$$0.15<D12/LD<0.45 \tag{5a}$$

Further, it is more desirable to set the numerical ranges of Conditional Expressions (1) to (5) as follows:

$$LD/f<0.96 \tag{1b}$$

$$2.03<|fG1p/fG1n|<7.60 \tag{2b}$$

$$23.0<vdG1n<38.5 \tag{3b}$$

$$-0.0100<\theta gF\_G1n-(-1.665\times10^{-7}\times vdG1n^3+5.213\times 10^{-5}\times vdG1n^2-5.656\times10^{-3}\times vdG1n+0.7268)<-0.0020 \tag{4b}$$

$$0.17<D12/LD<0.40 \tag{5b}$$

Further, it is more desirable to set the numerical range of Conditional Expression (2) as follows:

$$2.91|fG1p/fG1n|<10.00 \tag{2c}$$

In this way, by using a material having high anomalous dispersion property as the material of the negative lens G1n, it is possible to dispose the positive lenses included in the first lens unit B1 relatively close to the image side. This makes it possible to effectively reduce the weight of the first lens unit B1, so that it is possible to reduce the weight of the optical system and properly correct chromatic aberrations.

Further, in each embodiment, it is desirable that one or more of the following conditional expressions be satisfied:

$$1.50<fG1p/fG2p<5.00 \tag{6}$$

$$vdG2p>73.0 \tag{7}$$

$$0.0100<\theta gF\_G2p-(-1.665\times10^{-7}\times vdG2p^3+5.213\times 10^{-5}\times vdG2p^2-5.656\times10^{-3}\times vdG2p+0.7268) <0.1000 \tag{8}$$

Here, the focal length of the positive lens G2p is fG2p, the Abbe number of the material of the positive lens G2p is vdG2p, and the partial dispersion ratio of the material of the positive lens G2p is $\theta gF\_G2p$.

Conditional Expression (6) is a conditional expression that prescribes the ratio between the focal length fG1p of the positive lens G1p and the focal length fG2p of the positive lens G2p. When fG1p/fG2p becomes less than the lower limit of Conditional Expression (6) and the focal length fG1p of the positive lens G1p becomes small, the refractive power of the positive lens G1p becomes too strong, as a result of which axial chromatic aberration frequently occurs at the positive lens G1p. Therefore, this is not desirable. In order to correct axial chromatic aberration that occurs at the positive lens G1p by the negative lenses included in the first lens unit B1, it is necessary to increase the number of negative lenses, as a result of which the weight of the optical system is increased. Therefore, this is not desirable.

When fG1p/fG2p becomes greater than the upper limit of Conditional Expression (6) and the focal length fG1p of the positive lens G1p becomes large, the refractive power of the positive lens G1p becomes too weak. As a result, light at the positive lens G1p cannot be sufficiently converged, and the effective diameter of a lens disposed on the image side of the positive lens G1p becomes large, thereby increasing the weight of the optical system. Therefore, this is not desirable.

Conditional Expression (7) is a conditional expression that prescribes the Abbe number vdG2p of the material of the positive lens G2p. When vdG2p becomes less than the lower limit of Conditional Expression (7) and becomes small, chromatic aberration occurs frequently at the positive lens G2p. Therefore, this is not desirable.

Conditional Expression (8) is a conditional expression that prescribes the anomalous dispersion property of the material of the positive lens G2p. By forming the positive lens G2p out of a material having high anomalous dispersion property, it is possible to correct second-order chromatic aberration of magnification more effectively. A material having a numerical value that is less than the lower limit of Conditional Expression (8) is of little practical use as an image taking optical system. When a material having a numerical value that is greater than the upper limit of Conditional Expression (8) is used as the material of the positive lens G2p, it is difficult to sufficiently correct second-order chromatic aberration of magnification. Therefore, this is not desirable.

The numerical ranges of Conditional Expressions (6) to (8) may be desirably set as follows:

$$1.55 < fG1p/fG2p < 4.50 \tag{6a}$$

$$vdG2p > 80.0 \tag{7a}$$

$$0.0120 < \theta gF\_G2p - (-1.665 \times 10^{-7} \times vdG2p^3 + 5.213 \times 10^{-5} \times vdG2p^2 - 5.656 \times 10^{-3} \times vdG2p + 0.7268) < 0.0600 \tag{8a}$$

Further, the numerical ranges of Conditional Expressions (6) to (8) may be more desirably set as follows:

$$1.60 < fG1p/fG2p < 4.00 \tag{6b}$$

$$vdG2p > 90.0 \tag{7b}$$

$$0.0150 < \theta gF\_G2p - (-1.665 \times 10^{-7} \times vdG2p^3 + 5.213 \times 10^{-5} \times vdG2p^2 - 5.656 \times 10^{-3} \times vdG2p + 0.7268) < 0.0400 \tag{8b}$$

It is desirable that the second lens unit B2 that moves during focusing include positive and negative lenses. This makes it possible to suppress variations in chromatic aberration, in particular, axial chromatic aberration during focusing.

It is desirable that the second lens unit B2 consist of two lenses or less. This makes it possible to reduce the weight of the focusing unit, and to further reduce the size and weight of a mechanism for driving the second lens unit B2, which is the focusing unit.

Further, in the present embodiment, it is desirable that the first lens unit B1 be immovable during focusing. The first lens unit B1 that is disposed closest to the object side among the lens units of the optical system has a large effective diameter and is heavy. In order to move the heavy first lens unit B1 during focusing, a large driving mechanism is required, as a result of which the weight of the optical system and the weight of an image pickup apparatus including the optical system are increased. Therefore, this is not desirable.

Numerical Examples 1 to 14 corresponding to the first to fourteenth embodiments are indicated. In each numerical example, i denotes the order of an optical surface from the object side. ri denotes a radius of curvature of an i-th optical surface (an i-th surface), di denotes an interval between the i-th surface and an (i+1)th surface, and ndi and vdi denote, respectively, the refractive index and the Abbe number of the material of an i-th optical member for a d-line. Regarding the change in interval between lens surfaces, the interval between lens surfaces when the lens is focused at infinity, and the interval between the lens surfaces when the lens is focused at a closest distance are indicated.

In each embodiment, a back focus (BF) refers to the distance from a surface of the optical system that is closest to the image side to the image plane in terms of air conversion length. Correspondences of the numerical examples with the aforementioned conditional expressions are shown in Table. In Table, $\Delta\theta gF\_Gi$ indicates the numerical value of $\theta gF\_Gi - (-1.665 \times 10^{-2} \times vdi^3 + 5.213 \times 10^{-5} \times vdi^2 - 5.656 \times 10^{-3} \times vdi + 0.7268)$.

A protective glass for protecting the lenses may be disposed on the object side of the first lens unit B1 in each embodiment. The protective glass having a very weak refractive power is assumed as not being included in the first lens unit B1.

Numerical Example 1

| | | | | | | | |
|---|---|---|---|---|---|---|---|
| Units: mm | | | | | | | |
| Surface Data | | | | | | | |
| Surface Number | r | d | nd | vd | Effective Diameter | θgF | ΔθgF |
| 1 | 150.642 | 16.15 | 1.59270 | 35.3 | 135.36 | | |
| 2 | 730.042 | 100.00 | | | 134.20 | | |
| 3 | 107.703 | 14.79 | 1.43387 | 95.1 | 84.27 | 0.5373 | 0.0201 |
| 4 | −328.442 | 0.27 | | | 82.15 | | |
| 5 | −318.403 | 3.00 | 1.85478 | 24.8 | 81.94 | 0.6122 | −0.0039 |
| 6 | 87.265 | 3.08 | | | 76.51 | | |
| 7 | 88.737 | 12.63 | 1.43387 | 95.1 | 76.87 | | |
| 8 | −1026.629 | 35.00 | | | 76.22 | | |
| 9 | 68.568 | 6.10 | 1.89286 | 20.4 | 62.07 | | |
| 10 | 127.179 | 5.00 | | | 60.58 | | |
| 11 | 68.368 | 2.30 | 1.65412 | 39.7 | 55.04 | | |
| 12 | 43.418 | 1.15 | | | 51.09 | | |
| 13 | 48.830 | 7.97 | 1.43387 | 95.1 | 51.07 | | |
| 14 | 133.424 | 7.57 | | | 49.03 | | |
| 15(aperture stop) | ∞ | (variable) | | | 44.73 | | |
| 16 | −3151.717 | 1.87 | 1.91082 | 35.3 | 40.00 | | |
| 17 | 61.271 | (variable) | | | 38.04 | | |
| 18 | 97.234 | 1.76 | 1.92286 | 20.9 | 33.23 | | |
| 19 | 63.011 | 9.17 | 1.56732 | 42.8 | 32.60 | | |
| 20 | −96.758 | 1.07 | | | 33.13 | | |
| 21 | 110.488 | 4.14 | 1.85025 | 30.1 | 32.94 | | |
| 22 | −106.157 | 1.44 | 1.59522 | 67.7 | 32.67 | | |
| 23 | 36.770 | 5.26 | | | 31.16 | | |

-continued

| Units: mm | | | | | |
|---|---|---|---|---|---|
| 24 | −77.293 | 1.47 | 1.72916 | 54.7 | 31.20 |
| 25 | 75.820 | 4.11 | | | 32.49 |
| 26 | 89.505 | 10.00 | 1.64769 | 33.8 | 36.21 |
| 27 | −216.973 | 0.15 | | | 38.52 |
| 28 | 77.954 | 12.44 | 1.73800 | 32.3 | 39.99 |
| 29 | −58.563 | 2.00 | 1.80809 | 22.8 | 39.98 |
| 30 | ∞ | 65.15 | | | 40.13 |
| Image Plane | ∞ | | | | |

| Various Data | |
|---|---|
| Focal Length | 392.55 |
| F-number | 2.90 |
| Half Angle of View | 3.15 |
| Image Height | 21.64 |
| Overall Lens Length | 371.25 |
| BF | 65.15 |

| | ∞ | −0.16X |
|---|---|---|
| d15 | 5.89 | 20.04 |
| d17 | 30.34 | 16.19 |

| | |
|---|---|
| Position of Entrance Pupil | 532.27 |
| Position of Exit Pupil | −104.85 |
| Forward Principal Point Position | 18.38 |
| Rear Principal Point Position | −327.40 |

| Lens Unit Data | | | | | |
|---|---|---|---|---|---|
| Unit | Starting Surface | Focal Length | Lens Structure Length | Forward Principal Point Position | Rear Principal Point Position |
| 1 | 1 | 175.07 | 215.00 | 163.73 | −118.69 |
| 2 | 16 | −65.97 | 1.87 | 0.96 | −0.02 |
| 3 | 18 | 183.65 | 53.01 | 23.36 | −15.91 |

| Single Lens Data | | |
|---|---|---|
| Lens | Starting Surface | Focal Length |
| 1 | 1 | 316.96 |
| 2 | 3 | 188.88 |
| 3 | 5 | −79.86 |
| 4 | 7 | 188.90 |
| 5 | 9 | 158.84 |
| 6 | 11 | −188.77 |
| 7 | 13 | 172.59 |
| 8 | 16 | −65.97 |
| 9 | 18 | −198.89 |
| 10 | 19 | 68.69 |
| 11 | 21 | 64.24 |
| 12 | 22 | −45.71 |
| 13 | 24 | −52.28 |
| 14 | 26 | 99.10 |
| 15 | 28 | 47.14 |
| 16 | 29 | −72.47 |

Numerical Example 2

| Units: mm | | | | | | | |
|---|---|---|---|---|---|---|---|
| Surface Data | | | | | | | |
| Surface Number | r | d | nd | vd | Effective Diameter | θgF | ΔθgF |
| 1 | 304.232 | 11.77 | 1.59551 | 39.2 | 134.48 | | |
| 2 | −3473.263 | 130.00 | | | 133.88 | | |
| 3 | 135.555 | 14.53 | 1.43387 | 95.1 | 93.09 | 0.5373 | 0.0201 |
| 4 | −474.298 | 0.42 | | | 91.37 | | |

-continued

| \multicolumn{7}{c|}{Units: mm} |
|---|---|---|---|---|---|---|---|
| 5 | −431.027 | 4.00 | 1.73800 | 32.3 | 91.22 | 0.5899 | −0.0031 |
| 6 | 247.150 | 3.00 | | | 88.10 | | |
| 7 | 88.485 | 12.33 | 1.43387 | 95.1 | 85.53 | | |
| 8 | 462.085 | 1.00 | | | 83.92 | | |
| 9 | 73.802 | 4.50 | 1.65412 | 39.7 | 77.43 | | |
| 10 | 57.758 | (variable) | | | 72.10 | | |
| 11 | 249.332 | 8.55 | 1.80809 | 22.8 | 60.63 | | |
| 12 | −145.324 | 2.60 | 1.85478 | 24.8 | 59.32 | | |
| 13 | 149.847 | (variable) | | | 56.49 | | |
| 14(aperture stop) | ∞ | 6.99 | | | 40.88 | | |
| 15 | 236.895 | 1.90 | 1.83481 | 42.7 | 38.53 | | |
| 16 | 79.511 | 5.11 | 1.53775 | 74.7 | 37.72 | | |
| 17 | −211.462 | 41.94 | | | 37.34 | | |
| 18 | 270.103 | 2.34 | 1.80518 | 25.4 | 20.27 | | |
| 19 | −92.625 | 1.62 | 1.62299 | 58.2 | 19.86 | | |
| 20 | 39.986 | 2.11 | | | 18.85 | | |
| 21 | −65.825 | 1.57 | 1.77250 | 49.6 | 18.79 | | |
| 22 | 149.119 | 2.19 | | | 19.24 | | |
| 23 | 80.993 | 3.17 | 1.63980 | 34.5 | 20.64 | | |
| 24 | −114.908 | 50.87 | | | 21.09 | | |
| 25 | −494.014 | 7.22 | 1.67270 | 32.1 | 33.69 | | |
| 26 | −29.034 | 1.80 | 1.83481 | 42.7 | 34.04 | | |
| 27 | 143.833 | 1.45 | | | 36.41 | | |
| 28 | 81.978 | 9.87 | 1.73800 | 32.3 | 38.45 | | |
| 29 | −38.887 | 1.80 | 1.92286 | 18.9 | 38.93 | | |
| 30 | −74.668 | 65.00 | | | 40.16 | | |
| Image Plane | ∞ | | | | | | |

| \multicolumn{2}{c|}{Various Data} |
|---|---|
| Focal Length | 780.00 |
| F-number | 5.80 |
| Half Angle of View | 1.59 |
| Image Height | 21.64 |
| Overall Lens Length | 490.00 |
| BF | 65.00 |

| | ∞ | −0.15X |
|---|---|---|
| d10 | 35.94 | 72.66 |
| d13 | 54.41 | 17.69 |

| | |
|---|---|
| Position of Entrance Pupil | 862.03 |
| Position of Exit Pupil | −239.64 |
| Forward Principal Point Position | −355.06 |
| Rear Principal Point Position | −715.00 |

Lens Unit Data

| Unit | Starting Surface | Focal Length | Lens Structure Length | Forward Principal Point Position | Rear Principal Point Position |
|---|---|---|---|---|---|
| 1 | 1 | 298.08 | 181.56 | 38.61 | −127.38 |
| 2 | 11 | −374.69 | 11.15 | 13.67 | 7.28 |
| 3 | 14 | −654.05 | 141.95 | −152.97 | −439.31 |

Single Lens Data

| Lens | Starting Surface | Focal Length |
|---|---|---|
| 1 | 1 | 470.28 |
| 2 | 3 | 244.75 |
| 3 | 5 | −212.31 |
| 4 | 7 | 249.75 |
| 5 | 9 | −456.83 |
| 6 | 11 | 114.73 |
| 7 | 12 | −85.96 |
| 8 | 15 | −144.16 |
| 9 | 16 | 108.12 |
| 10 | 18 | 85.91 |
| 11 | 19 | −44.62 |
| 12 | 21 | −58.93 |
| 13 | 23 | 74.73 |
| 14 | 25 | 45.57 |
| 15 | 26 | −28.80 |

-continued

| Units: mm | | |
|---|---|---|
| 16 | 28 | 37.02 |
| 17 | 29 | −90.11 |

Numerical Example 3

| Units: mm | | | | | | | |
|---|---|---|---|---|---|---|---|
| Surface Data | | | | | | | |
| Surface Number | r | d | nd | vd | Effective Diameter | θgF | ΔθgF |
| 1 | 302.631 | 13.68 | 1.53172 | 48.8 | 141.98 | | |
| 2 | −1528.554 | 150.00 | | | 141.38 | | |
| 3 | 111.159 | 17.83 | 1.43387 | 95.1 | 91.72 | 0.5373 | 0.0201 |
| 4 | −262.152 | 0.30 | | | 89.76 | | |
| 5 | −272.660 | 3.80 | 1.73800 | 32.3 | 89.31 | 0.5899 | −0.0031 |
| 6 | 128.018 | 0.50 | | | 84.42 | | |
| 7 | 82.578 | 13.73 | 1.43387 | 95.1 | 84.07 | | |
| 8 | 648.537 | 62.47 | | | 82.66 | | |
| 9(aperture stop) | ∞ | 1.5 | | | 51.15 | | |
| 10 | 74.152 | 9.64 | 1.80809 | 22.8 | 48.30 | | |
| 11 | −92.697 | 1.50 | 1.90315 | 29.8 | 46.76 | | |
| 12 | 56.781 | (variable) | | | 42.24 | | |
| 13 | 100.319 | 1.80 | 1.80809 | 22.8 | 29.08 | | |
| 14 | 56.270 | 4.40 | 1.90366 | 31.3 | 28.33 | | |
| 15 | 157.977 | (variable) | | | 27.36 | | |
| 16 | 69.858 | 4.69 | 1.85478 | 24.8 | 25.00 | | |
| 17 | −79.548 | 1.62 | 1.76385 | 48.5 | 23.95 | | |
| 18 | 39.816 | 2.99 | | | 23.03 | | |
| 19 | −78.851 | 1.57 | 1.91082 | 35.3 | 23.10 | | |
| 20 | 119.107 | 3.02 | | | 23.76 | | |
| 21 | 122.941 | 4.72 | 1.51633 | 64.1 | 25.73 | | |
| 22 | −49.179 | 2.56 | | | 26.47 | | |
| 23 | −43.755 | 1.70 | 1.76385 | 48.5 | 26.94 | | |
| 24 | −95.999 | 22.67 | | | 28.05 | | |
| 25 | 218.669 | 8.46 | 1.73800 | 32.3 | 39.79 | | |
| 26 | −43.667 | 1.90 | 1.92286 | 18.9 | 40.29 | | |
| 27 | −79.787 | 85.94 | | | 41.38 | | |
| Image Plane | ∞ | | | | | | |

| Various Data | |
|---|---|
| Focal Length | 584.98 |
| F-number | 4.12 |
| Half Angle of View | 2.12 |
| Image Height | 21.64 |
| Overall Lens Length | 476.10 |
| BF | 85.94 |

| | ∞ | −0.14X |
|---|---|---|
| d12 | 48.06 | 4.82 |
| d15 | 5.05 | 48.29 |

| | |
|---|---|
| Position of Entrance Pupil | 618.32 |
| Position of Exit Pupil | −265.10 |
| Forward Principal Point Position | 228.49 |
| Rear Principal Point Position | −499.04 |

| Lens Unit Data | | | | | |
|---|---|---|---|---|---|
| Unit | Starting Surface | Focal Length | Lens Structure Length | Forward Principal Point Position | Rear Principal Point Position |
| 1 | 1 | 492.97 | 274.95 | −443.17 | −343.41 |
| 2 | 13 | 238.41 | 6.20 | −4.10 | −7.28 |
| 3 | 16 | −1576.39 | 55.91 | −594.87 | −1036.81 |

-continued

| Units: mm | | |
|---|---|---|
| Single Lens Data | | |
| Lens | Starting Surface | Focal Length |
| 1 | 1 | 476.33 |
| 2 | 3 | 182.55 |
| 3 | 5 | −117.57 |
| 4 | 7 | 216.51 |
| 5 | 10 | 52.33 |
| 6 | 11 | −38.80 |
| 7 | 13 | −161.53 |
| 8 | 14 | 94.77 |
| 9 | 16 | 44.15 |
| 10 | 17 | −34.54 |
| 11 | 19 | −51.89 |
| 12 | 21 | 68.67 |
| 13 | 23 | −106.76 |
| 14 | 25 | 50.01 |
| 15 | 26 | −107.23 |

Numerical Example 4

| Units: mm | | | | | | |
|---|---|---|---|---|---|---|
| Surface Data | | | | | | |
| Surface Number | r | d | nd | vd | Effective Diameter | θgF | ΔθgF |
| 1 | 303.500 | 14.27 | 1.48749 | 70.2 | 141.99 | | |
| 2 | −1119.197 | 125.00 | | | 141.42 | | |
| 3 | 133.848 | 18.28 | 1.43387 | 95.1 | 100.56 | 0.5373 | 0.0201 |
| 4 | −278.409 | 1.00 | | | 98.74 | | |
| 5 | −272.653 | 4.45 | 1.67300 | 38.1 | 97.88 | 0.5754 | −0.0022 |
| 6 | 341.744 | 7.63 | | | 93.96 | | |
| 7 | 85.208 | 13.41 | 1.43387 | 95.1 | 88.08 | | |
| 8 | 451.394 | 1.00 | | | 86.17 | | |
| 9 | 68.525 | 5.00 | 1.51742 | 52.4 | 77.54 | | |
| 10 | 52.234 | (variable) | | | 70.88 | | |
| 11 | 477.269 | 7.06 | 1.80809 | 22.8 | 64.98 | | |
| 12 | −180.144 | 2.60 | 1.85025 | 30.1 | 63.77 | | |
| 13 | 158.963 | (variable) | | | 60.68 | | |
| 14(aperture stop) | ∞ | 6.99 | | | 43.66 | | |
| 15 | 1790.868 | 1.90 | 1.83481 | 42.7 | 41.15 | | |
| 16 | 53.608 | 8.55 | 1.59522 | 67.7 | 40.01 | | |
| 17 | −120.253 | 17.05 | | | 39.67 | | |
| 18 | 99.470 | 4.03 | 1.80518 | 25.4 | 31.84 | | |
| 19 | −110.952 | 1.62 | 1.62299 | 58.2 | 31.25 | | |
| 20 | 41.547 | 4.33 | | | 28.91 | | |
| 21 | −68.903 | 1.57 | 1.77250 | 49.6 | 28.86 | | |
| 22 | 209.179 | 3.12 | | | 29.01 | | |
| 23 | 99.162 | 3.52 | 1.73800 | 32.3 | 29.71 | | |
| 24 | −277.851 | 48.07 | | | 29.67 | | |
| 25 | 161.753 | 6.28 | 1.73800 | 32.3 | 39.71 | | |
| 26 | −73.339 | 1.90 | 1.92286 | 18.9 | 39.80 | | |
| 27 | −283.372 | 93.89 | | | 40.13 | | |
| Image Plane | ∞ | | | | | | |

| Various Data | |
|---|---|
| Focal Length | 584.99 |
| F-number | 4.12 |
| Half Angle of View | 2.12 |
| Image Height | 21.64 |
| Overall Lens Length | 476.09 |
| BF | 93.89 |

| | ∞ | −0.14X |
|---|---|---|
| d10 | 22.54 | 47.33 |
| d13 | 51.04 | 26.25 |

-continued

| Units: mm | |
|---|---|
| Position of Entrance Pupil | 786.58 |
| Position of Exit Pupil | −161.90 |
| Forward Principal Point Position | 33.70 |
| Rear Principal Point Position | −491.10 |

Lens Unit Data

| Unit | Starting Surface | Focal Length | Lens Structure Length | Forward Principal Point Position | Rear Principal Point Position |
|---|---|---|---|---|---|
| 1 | 1 | 241.29 | 190.04 | 75.74 | −108.88 |
| 2 | 11 | −260.30 | 9.66 | 7.63 | 2.26 |
| 3 | 14 | −13347.44 | 108.92 | −4161.70 | −6209.10 |

Single Lens Data

| Lens | Starting Surface | Focal Length |
|---|---|---|
| 1 | 1 | 491.38 |
| 2 | 3 | 211.17 |
| 3 | 5 | −224.69 |
| 4 | 7 | 239.44 |
| 5 | 9 | −474.28 |
| 6 | 11 | 162.62 |
| 7 | 12 | −98.97 |
| 8 | 15 | −66.23 |
| 9 | 16 | 63.46 |
| 10 | 18 | 65.70 |
| 11 | 19 | −48.32 |
| 12 | 21 | −66.93 |
| 13 | 23 | 99.42 |
| 14 | 25 | 69.16 |
| 15 | 26 | −107.69 |

Numerical Example 5

| Units: mm | | | | | | | |
|---|---|---|---|---|---|---|---|
| Surface Data | | | | | | | |
| Surface Number | r | d | nd | vd | Effective Diameter | θgF | ΔθgF |
| 1 | 256.651 | 12.30 | 1.53172 | 48.8 | 118.70 | | |
| 2 | −898.293 | 100.00 | | | 118.14 | | |
| 3 | 123.678 | 14.23 | 1.43387 | 95.1 | 82.63 | 0.5373 | 0.0201 |
| 4 | −250.852 | 0.30 | | | 80.94 | | |
| 5 | −236.670 | 3.50 | 1.73800 | 32.3 | 80.85 | 0.5899 | −0.0031 |
| 6 | 159.068 | 1.00 | | | 77.47 | | |
| 7 | 73.782 | 12.65 | 1.43387 | 95.1 | 76.56 | | |
| 8 | 562.749 | 1.00 | | | 75.14 | | |
| 9 | 50.236 | 3.50 | 1.73800 | 32.3 | 67.65 | | |
| 10 | 44.936 | 47.20 | | | 63.78 | | |
| 11 | 81.633 | 7.02 | 1.80809 | 22.8 | 45.69 | | |
| 12 | −345.170 | 2.00 | 1.90366 | 31.3 | 44.08 | | |
| 13 | 59.571 | 12.67 | | | 40.95 | | |
| 14(aperture stop) | ∞ | (variable) | | | 38.36 | | |
| 15 | 72.373 | 1.85 | 1.90366 | 31.3 | 30.81 | | |
| 16 | 70.798 | 3.44 | 1.53775 | 74.7 | 30.16 | | |
| 17 | 618.776 | (variable) | | | 29.48 | | |
| 18 | 112.273 | 3.56 | 1.84666 | 23.8 | 28.12 | | |
| 19 | −85.446 | 1.61 | 1.77250 | 49.6 | 27.52 | | |
| 20 | 43.801 | 3.33 | | | 25.58 | | |
| 21 | −71.870 | 1.50 | 1.91082 | 35.3 | 25.51 | | |
| 22 | 7154.260 | 12.83 | | | 25.59 | | |
| 23 | −86.248 | 2.42 | 1.61340 | 44.3 | 29.01 | | |
| 24 | −66.648 | 20.00 | | | 29.85 | | |
| 25 | 134.333 | 8.24 | 1.67300 | 38.1 | 39.36 | | |

-continued

| Units: mm | | | | | |
|---|---|---|---|---|---|
| 26 | −50.197 | 1.80 | 1.80809 | 22.8 | 39.68 |
| 27 | −115.724 | 106.46 | | | 40.39 |
| Image Plane | ∞ | | | | |

| Various Data | |
|---|---|
| Focal Length | 489.05 |
| F-number | 4.12 |
| Half Angle of View | 2.53 |
| Image Height | 21.64 |
| Overall Lens Length | 411.08 |
| BF | 106.46 |

| | ∞ | −0.14X |
|---|---|---|
| d14 | 24.67 | 2.00 |
| d17 | 2.00 | 24.67 |

| | |
|---|---|
| Position of Entrance Pupil | 565.70 |
| Position of Exit Pupil | −158.34 |
| Forward Principal Point Position | 151.57 |
| Rear Principal Point Position | −382.58 |

| Lens Unit Data | | | | | |
|---|---|---|---|---|---|
| Unit | Starting Surface | Focal Length | Lens Structure Length | Forward Principal Point Position | Rear Principal Point Position |
| 1 | 1 | 414.18 | 204.70 | −309.53 | −268.47 |
| 2 | 14 | 152.99 | 29.96 | 23.47 | −4.38 |
| 3 | 18 | −441.84 | 55.28 | −166.34 | −347.04 |

| Single Lens Data | | |
|---|---|---|
| Lens | Starting Surface | Focal Length |
| 1 | 1 | 376.81 |
| 2 | 3 | 193.15 |
| 3 | 5 | −128.42 |
| 4 | 7 | 194.19 |
| 5 | 9 | −802.16 |
| 6 | 11 | 82.30 |
| 7 | 12 | −56.09 |
| 8 | 15 | −8138.48 |
| 9 | 16 | 148.34 |
| 10 | 18 | 57.78 |
| 11 | 19 | −37.28 |
| 12 | 21 | −78.11 |
| 13 | 23 | 456.65 |
| 14 | 25 | 55.29 |
| 15 | 26 | −111.07 |

Numerical Example 6

| Units: mm | | | | | | |
|---|---|---|---|---|---|---|
| Surface Data | | | | | | |
| Surface Number | r | d | nd | vd | Effective Diameter | θgF | ΔθgF |
| 1 | 303.613 | 11.69 | 1.54814 | 45.8 | 118.70 | | |
| 2 | −720.087 | 95.00 | | | 118.22 | | |
| 3 | 145.704 | 14.21 | 1.43387 | 95.1 | 85.77 | 0.5373 | 0.0201 |
| 4 | −228.748 | 0.30 | | | 84.22 | | |
| 5 | −214.415 | 3.50 | 1.74950 | 35.3 | 84.19 | 0.5818 | −0.0029 |
| 6 | 190.939 | 2.00 | | | 81.27 | | |
| 7 | 78.997 | 14.38 | 1.43387 | 95.1 | 80.42 | | |
| 8 | 1108.619 | 1.00 | | | 78.73 | | |
| 9 | 54.119 | 3.50 | 1.73800 | 32.3 | 71.00 | | |
| 10 | 47.476 | 66.65 | | | 66.93 | | |

-continued

| | | Units: mm | | | |
|---|---|---|---|---|---|
| 11 | 87.668 | 4.79 | 1.80809 | 22.8 | 42.48 |
| 12 | 171.534 | 2.00 | 1.91082 | 35.3 | 40.89 |
| 13 | 66.228 | 7.96 | | | 39.19 |
| 14(aperture stop) | ∞ | (variable) | | | 37.65 |
| 15 | 76.142 | 1.85 | 1.90366 | 31.3 | 29.64 |
| 16 | 75.600 | 3.27 | 1.53775 | 74.7 | 29.01 |
| 17 | 778.003 | (variable) | | | 28.33 |
| 18 | 123.763 | 3.56 | 1.84666 | 23.8 | 26.99 |
| 19 | −70.153 | 1.61 | 1.77250 | 49.6 | 26.40 |
| 20 | 41.736 | 3.54 | | | 24.48 |
| 21 | −68.635 | 1.50 | 1.91082 | 35.3 | 24.32 |
| 22 | −1082.263 | 4.25 | | | 24.42 |
| 23 | −62.341 | 2.40 | 1.67300 | 38.1 | 24.59 |
| 24 | −48.987 | 31.15 | | | 25.36 |
| 25 | 107.183 | 8.24 | 1.67300 | 38.1 | 39.48 |
| 26 | −54.390 | 1.80 | 1.80809 | 22.8 | 39.71 |
| 27 | −153.673 | 94.42 | | | 40.28 |
| Image Plane | ∞ | | | | |

Various Data

| Focal Length | 489.05 |
|---|---|
| F-number | 4.12 |
| Half Angle of View | 2.53 |
| Image Height | 21.64 |
| Overall Lens Length | 411.08 |
| BF | 94.42 |

| | ∞ | −0.14X |
|---|---|---|
| d14 | 24.52 | 2.00 |
| d17 | 2.00 | 24.52 |

| Position of Entrance Pupil | 605.93 |
|---|---|
| Position of Exit Pupil | −158.62 |
| Forward Principal Point Position | 149.81 |
| Rear Principal Point Position | −394.63 |

Lens Unit Data

| Unit | Starting Surface | Focal Length | Lens Structure Length | Forward Principal Point Position | Rear Principal Point Position |
|---|---|---|---|---|---|
| 1 | 1 | 383.47 | 219.01 | −229.79 | −254.89 |
| 2 | 14 | 155.98 | 29.64 | 23.46 | −4.15 |
| 3 | 18 | −376.55 | 58.04 | −140.90 | −308.38 |

Single Lens Data

| Lens | Starting Surface | Focal Length |
|---|---|---|
| 1 | 1 | 391.20 |
| 2 | 3 | 207.53 |
| 3 | 5 | −134.26 |
| 4 | 7 | 195.22 |
| 5 | 9 | −675.14 |
| 6 | 11 | 216.37 |
| 7 | 12 | −119.52 |
| 8 | 15 | 18912.95 |
| 9 | 16 | 155.46 |
| 10 | 18 | 53.33 |
| 11 | 19 | −33.66 |
| 12 | 21 | −80.51 |
| 13 | 23 | 316.92 |
| 14 | 25 | 54.73 |
| 15 | 26 | −105.03 |

Numerical Example 7

| | | | Units: mm | | | | |
|---|---|---|---|---|---|---|---|
| | | | Surface Data | | | | |
| Surface Number | r | d | nd | vd | Effective Diameter | θgF | ΔθgF |
| 1 | 272.017 | 15.63 | 1.53172 | 48.8 | 135.37 | | |
| 2 | −661.466 | 75.00 | | | 134.73 | | |
| 3 | 161.777 | 18.72 | 1.43387 | 95.1 | 101.09 | 0.5373 | 0.0201 |
| 4 | −196.205 | 0.20 | | | 99.09 | | |
| 5 | −199.530 | 4.30 | 1.73800 | 32.3 | 98.73 | 0.5899 | −0.0031 |
| 6 | 281.165 | 0.50 | | | 94.56 | | |
| 7 | 92.859 | 12.89 | 1.43387 | 95.1 | 92.38 | | |
| 8 | 395.372 | 50.00 | | | 90.76 | | |
| 9 | 91.563 | 6.68 | 1.92286 | 18.9 | 57.92 | | |
| 10 | 21270.468 | 1.80 | 1.85478 | 24.8 | 56.63 | | |
| 11 | 53.190 | 17.97 | | | 51.03 | | |
| 12(aperture stop) | ∞ | (variable) | | | 47.07 | | |
| 13 | 72.592 | 5.63 | 1.59522 | 67.7 | 34.46 | | |
| 14 | −269.274 | 1.70 | 1.51633 | 64.1 | 33.25 | | |
| 15 | 189.489 | (variable) | | | 32.01 | | |
| 16 | 133.885 | 4.62 | 1.84666 | 23.8 | 27.82 | | |
| 17 | −109.073 | 1.71 | 1.65160 | 58.5 | 26.59 | | |
| 18 | 41.354 | 3.05 | | | 24.48 | | |
| 19 | −76.188 | 1.63 | 1.88300 | 40.8 | 24.53 | | |
| 20 | 142.443 | 11.01 | | | 25.43 | | |
| 21 | 523.344 | 5.91 | 1.61340 | 44.3 | 33.31 | | |
| 22 | −41.876 | 2.00 | 1.69895 | 30.1 | 34.14 | | |
| 23 | −87.849 | 17.30 | | | 35.78 | | |
| 24 | 86.521 | 9.20 | 1.61340 | 44.3 | 45.71 | | |
| 25 | −70.765 | 1.91 | 1.80809 | 22.8 | 45.84 | | |
| 26 | −141.307 | 60.00 | | | 46.30 | | |
| Image Plane | ∞ | | | | | | |

| Various Data | |
|---|---|
| Focal Length | 392.57 |
| F-number | 2.90 |
| Half Angle of View | 3.15 |
| Image Height | 21.64 |
| Overall Lens Length | 371.15 |
| BF | 60.00 |

| | ∞ | −0.16X |
|---|---|---|
| d12 | 34.43 | 1.00 |
| d15 | 7.36 | 40.79 |

| | |
|---|---|
| Position of Entrance Pupil | 497.61 |
| Position of Exit Pupil | −312.22 |
| Forward Principal Point Position | 476.15 |
| Rear Principal Point Position | −332.57 |

| | | | Lens Unit Data | | |
|---|---|---|---|---|---|
| Unit | Starting Surface | Focal Length | Lens Structure Length | Forward Principal Point Position | Rear Principal Point Position |
| 1 | 1 | 394.38 | 185.72 | −252.79 | −240.54 |
| 2 | 12 | 170.54 | 41.75 | 32.44 | −6.55 |
| 3 | 16 | 591.22 | 58.35 | 271.96 | 414.18 |

| Single Lens Data | | |
|---|---|---|
| Lens | Starting Surface | Focal Length |
| 1 | 1 | 364.63 |
| 2 | 3 | 207.65 |
| 3 | 5 | −157.54 |
| 4 | 7 | 276.16 |
| 5 | 9 | 99.63 |

-continued

| | Units: mm | |
|---|---|---|
| 6 | 10 | −62.38 |
| 7 | 13 | 96.66 |
| 8 | 14 | −215.14 |
| 9 | 16 | 71.62 |
| 10 | 17 | −45.81 |
| 11 | 19 | −56.02 |
| 12 | 21 | 63.46 |
| 13 | 22 | −116.57 |
| 14 | 24 | 64.91 |
| 15 | 25 | −177.56 |

Numerical Example 8

| | | | Units: mm | | | | |
|---|---|---|---|---|---|---|---|
| | | | Surface Data | | | | |
| Surface Number | r | d | nd | vd | Effective Diameter | θgF | ΔθgF |
| 1 | 385.526 | 13.44 | 1.51823 | 58.9 | 134.25 | | |
| 2 | −571.729 | 77.00 | | | 133.81 | | |
| 3 | 138.510 | 20.20 | 1.43387 | 95.1 | 105.47 | 0.5373 | 0.0201 |
| 4 | −239.954 | 0.88 | | | 103.58 | | |
| 5 | −236.997 | 4.45 | 1.72047 | 34.7 | 102.71 | 0.5834 | −0.0029 |
| 6 | 413.620 | 1.96 | | | 98.82 | | |
| 7 | 89.685 | 13.98 | 1.49700 | 81.5 | 94.58 | | |
| 8 | 401.260 | 1.00 | | | 92.61 | | |
| 9 | 73.362 | 4.00 | 1.51633 | 64.1 | 83.23 | | |
| 10 | 55.381 | (variable) | | | 76.71 | | |
| 11 | 676.714 | 8.83 | 1.80809 | 22.8 | 71.19 | | |
| 12 | −131.916 | 2.50 | 1.85025 | 30.1 | 69.98 | | |
| 13 | 177.931 | (variable) | | | 66.25 | | |
| 14(aperture stop) | ∞ | 6.99 | | | 47.46 | | |
| 15 | 389.162 | 1.90 | 1.83481 | 42.7 | 44.83 | | |
| 16 | 50.248 | 10.20 | 1.59522 | 67.7 | 43.35 | | |
| 17 | −104.244 | 21.30 | | | 42.94 | | |
| 18 | 62.380 | 4.41 | 1.80518 | 25.4 | 30.44 | | |
| 19 | −125.782 | 1.62 | 1.62299 | 58.2 | 29.62 | | |
| 20 | 29.348 | 4.45 | | | 26.31 | | |
| 21 | −76.872 | 1.50 | 1.77250 | 49.6 | 26.33 | | |
| 22 | 90.429 | 3.40 | | | 27.45 | | |
| 23 | 62.033 | 5.17 | 1.73800 | 32.3 | 31.17 | | |
| 24 | −269.003 | 11.30 | | | 31.75 | | |
| 25 | 63.333 | 7.28 | 1.73800 | 32.3 | 35.82 | | |
| 26 | −65.540 | 1.50 | 1.92286 | 18.9 | 35.62 | | |
| 27 | 179.797 | 60.88 | | | 35.48 | | |
| Image Plane | ∞ | | | | | | |

| Various Data | |
|---|---|
| Focal Length | 392.00 |
| F-number | 2.92 |
| Half Angle of View | 3.16 |
| Image Height | 21.64 |
| Overall Lens Length | 371.00 |
| BF | 60.88 |

| | ∞ | −0.17X |
|---|---|---|
| d10 | 23.34 | 58.96 |
| d13 | 57.54 | 21.92 |

| Position of Entrance Pupil | 604.24 |
|---|---|
| Position of Exit Pupil | −69.07 |
| Forward Principal Point Position | −186.31 |
| Rear Principal Point Position | −331.12 |

-continued

| | | | Units: mm | | |
|---|---|---|---|---|---|

| | | | Lens Unit Data | | |
|---|---|---|---|---|---|
| Unit | Starting Surface | Focal Length | Lens Structure Length | Forward Principal Point Position | Rear Principal Point Position |
| 1 | 1 | 218.77 | 136.91 | 38.12 | −80.51 |
| 2 | 11 | −258.49 | 11.33 | 8.11 | 1.81 |
| 3 | 14 | −1780.17 | 81.01 | 39.35 | −30.56 |

| | Single Lens Data | |
|---|---|---|
| Lens | Starting Surface | Focal Length |
| 1 | 1 | 446.46 |
| 2 | 3 | 205.73 |
| 3 | 5 | −208.53 |
| 4 | 7 | 228.98 |
| 5 | 9 | −473.50 |
| 6 | 11 | 137.28 |
| 7 | 12 | −88.77 |
| 8 | 15 | −69.29 |
| 9 | 16 | 58.40 |
| 10 | 18 | 52.34 |
| 11 | 19 | −38.04 |
| 12 | 21 | −53.58 |
| 13 | 23 | 68.76 |
| 14 | 25 | 44.72 |
| 15 | 26 | −51.89 |

Numerical Example 9

| | | | Units: mm | | | | |
|---|---|---|---|---|---|---|---|

| | | | Surface Data | | | | |
|---|---|---|---|---|---|---|---|
| Surface Number | r | d | nd | νd | Effective Diameter | θgF | ΔθgF |
| 1 | 253.206 | 15.70 | 1.53172 | 48.8 | 135.37 | | |
| 2 | −794.645 | 80.00 | | | 134.68 | | |
| 3 | 120.312 | 19.13 | 1.43387 | 95.1 | 98.20 | 0.5373 | 0.0201 |
| 4 | −255.664 | 0.27 | | | 95.99 | | |
| 5 | −251.994 | 4.30 | 1.73800 | 32.3 | 95.75 | 0.5899 | −0.0031 |
| 6 | 185.815 | 2.00 | | | 90.53 | | |
| 7 | 78.093 | 14.41 | 1.43387 | 95.1 | 87.97 | | |
| 8 | 395.372 | 1.00 | | | 86.16 | | |
| 9 | 65.333 | 5.00 | 1.73800 | 32.3 | 77.77 | | |
| 10 | 52.898 | 55.75 | | | 71.52 | | |
| 11 | 131.577 | 5.85 | 1.92286 | 18.9 | 47.81 | | |
| 12 | −173.016 | 1.80 | 2.00100 | 29.1 | 46.87 | | |
| 13 | 79.693 | 5.11 | | | 44.10 | | |
| 14(aperture stop) | ∞ | (variable) | | | 43.54 | | |
| 15 | 84.346 | 5.20 | 1.76385 | 48.5 | 34.24 | | |
| 16 | −330.244 | 1.50 | 1.78760 | 23.4 | 33.22 | | |
| 17 | 500.351 | (variable) | | | 32.49 | | |
| 18 | 119.964 | 5.15 | 1.84666 | 23.8 | 28.83 | | |
| 19 | −81.582 | 1.71 | 1.67790 | 55.3 | 27.56 | | |
| 20 | 38.192 | 3.96 | | | 26.61 | | |
| 21 | −65.854 | 1.63 | 1.76200 | 40.1 | 26.66 | | |
| 22 | 131.367 | 11.01 | | | 27.85 | | |
| 23 | 595.238 | 4.99 | 1.51633 | 64.1 | 36.10 | | |
| 24 | −86.999 | 10.16 | | | 37.37 | | |
| 25 | 76.297 | 10.02 | 1.61340 | 44.3 | 44.95 | | |
| 26 | −60.967 | 1.91 | 1.92286 | 18.9 | 45.06 | | |
| 27 | −120.249 | 66.01 | | | 45.73 | | |
| Image Plane | ∞ | | | | | | |

| Various Data | |
|---|---|
| Focal Length | 392.57 |
| F-number | 2.90 |

-continued

| Units: mm | |
|---|---|
| Half Angle of View | 3.15 |
| Image Height | 21.64 |
| Overall Lens Length | 371.15 |
| BF | 66.01 |

| | ∞ | −0.16X |
|---|---|---|
| d14 | 31.55 | 1.00 |
| d17 | 6.03 | 36.58 |

| | |
|---|---|
| Position of Entrance Pupil | 548.07 |
| Position of Exit Pupil | −202.24 |
| Forward Principal Point Position | 366.12 |
| Rear Principal Point Position | −326.56 |

Lens Unit Data

| Unit | Starting Surface | Focal Length | Lens Structure Length | Forward Principal Point Position | Rear Principal Point Position |
|---|---|---|---|---|---|
| 1 | 1 | 478.88 | 205.21 | −475.87 | −321.17 |
| 2 | 14 | 133.94 | 38.25 | 30.72 | −4.59 |
| 3 | 18 | 3089.85 | 50.55 | 1169.58 | 1813.90 |

Single Lens Data

| Lens | Starting Surface | Focal Length |
|---|---|---|
| 1 | 1 | 363.02 |
| 2 | 3 | 191.51 |
| 3 | 5 | −144.32 |
| 4 | 7 | 221.25 |
| 5 | 9 | −454.12 |
| 6 | 11 | 81.74 |
| 7 | 12 | −54.31 |
| 8 | 15 | 88.44 |
| 9 | 16 | −252.39 |
| 10 | 18 | 58.03 |
| 11 | 19 | −38.15 |
| 12 | 21 | −57.36 |
| 13 | 23 | 147.38 |
| 14 | 25 | 56.82 |
| 15 | 26 | −136.11 |

Numerical Example 10

| Units: mm | | | | | | |
|---|---|---|---|---|---|---|
| Surface Data | | | | | | |
| Surface Number | r | d | nd | vd | Effective Diameter | θgF | ΔθgF |
| 1 | 294.571 | 10.93 | 1.59270 | 35.3 | 100.87 | | |
| 2 | −427.284 | 50.00 | | | 100.40 | | |
| 3 | 87.155 | 16.09 | 1.43387 | 95.1 | 78.40 | 0.5373 | 0.0201 |
| 4 | −250.471 | 0.20 | | | 76.31 | | |
| 5 | −248.732 | 3.30 | 1.85478 | 24.8 | 76.12 | 0.6122 | −0.0039 |
| 6 | 245.249 | 0.30 | | | 73.12 | | |
| 7 | 57.005 | 12.25 | 1.43387 | 95.1 | 69.69 | | |
| 8 | 208.094 | 0.50 | | | 67.55 | | |
| 9 | 48.647 | 4.50 | 1.85478 | 24.8 | 60.46 | | |
| 10 | 39.822 | 34.21 | | | 54.77 | | |
| 11 | 110.427 | 4.43 | 1.92286 | 18.9 | 38.11 | | |
| 12 | −234.759 | 1.50 | 1.91082 | 35.3 | 37.06 | | |
| 13 | 45.695 | 5.31 | | | 34.20 | | |
| 14(aperture stop) | ∞ | (variable) | | | 33.67 | | |
| 15 | 48.513 | 6.40 | 1.59522 | 67.7 | 28.74 | | |
| 16 | −47.434 | 1.70 | 1.72916 | 54.7 | 27.90 | | |
| 17 | −203.760 | (variable) | | | 26.86 | | |
| 18 | 118.337 | 4.05 | 1.84666 | 23.9 | 24.81 | | |

-continued

| | | Units: mm | | | |
|---|---|---|---|---|---|
| 19 | −53.903 | 1.50 | 1.77250 | 49.6 | 23.88 |
| 20 | 34.010 | 3.73 | | | 22.69 |
| 21 | −53.303 | 1.50 | 1.80610 | 40.9 | 22.89 |
| 22 | 148.382 | 15.17 | | | 24.15 |
| 23 | 580.743 | 4.75 | 1.51742 | 52.4 | 37.96 |
| 24 | −79.778 | 0.20 | | | 39.06 |
| 25 | 79.802 | 10.01 | 1.65412 | 39.7 | 42.17 |
| 26 | −47.847 | 1.80 | 1.92286 | 18.9 | 42.40 |
| 27 | −95.313 | 60.48 | | | 43.34 |
| Image Plane | ∞ | | | | |

| Various Data | |
|---|---|
| Focal Length | 292.52 |
| F-number | 2.90 |
| Half Angle of View | 4.23 |
| Image Height | 21.64 |
| Overall Lens Length | 273.26 |
| BF | 60.48 |

| | ∞ | −0.17X |
|---|---|---|
| d14 | 16.44 | 1.00 |
| d17 | 1.99 | 17.44 |

| | |
|---|---|
| Position of Entrance Pupil | 343.18 |
| Position of Exit Pupil | −133.95 |
| Forward Principal Point Position | 195.61 |
| Rear Principal Point Position | −232.04 |

Lens Unit Data

| Unit | Starting Surface | Focal Length | Lens Structure Length | Forward Principal Point Position | Rear Principal Point Position |
|---|---|---|---|---|---|
| 1 | 1 | 383.25 | 138.21 | −430.69 | −251.00 |
| 2 | 14 | 77.20 | 24.54 | 16.95 | −4.53 |
| 3 | 18 | −683.60 | 42.71 | −275.39 | −521.08 |

Single Lens Data

| Lens | Starting Surface | Focal Length |
|---|---|---|
| 1 | 1 | 295.85 |
| 2 | 3 | 151.20 |
| 3 | 5 | −144.03 |
| 4 | 7 | 176.63 |
| 5 | 9 | −335.68 |
| 6 | 11 | 81.88 |
| 7 | 12 | −41.89 |
| 8 | 15 | 41.32 |
| 9 | 16 | −85.18 |
| 10 | 18 | 44.22 |
| 11 | 19 | −26.79 |
| 12 | 21 | −48.49 |
| 13 | 23 | 135.90 |
| 14 | 25 | 47.19 |
| 15 | 26 | −106.04 |

Numerical Example 11

| | | Units: mm | | | | | |
|---|---|---|---|---|---|---|---|
| Surface Data | | | | | | | |
| Surface Number | r | d | nd | vd | Effective Diameter | θgF | ΔθgF |
| 1 | 99.464 | 14.87 | 1.59270 | 35.3 | 101.04 | | |
| 2 | 456.909 | 64.58 | | | 99.29 | | |
| 3 | 80.681 | 11.90 | 1.43387 | 95.1 | 62.00 | 0.5373 | 0.0201 |

| | | | | | | | |
|---|---|---|---|---|---|---|---|
| | | | Units: mm | | | | |
| 4 | −167.967 | 0.15 | | | 60.11 | | |
| 5 | −166.869 | 2.30 | 1.85478 | 24.8 | 59.92 | 0.6122 | −0.0039 |
| 6 | 51.072 | 0.15 | | | 54.95 | | |
| 7 | 50.726 | 11.60 | 1.43387 | 95.1 | 55.04 | | |
| 8 | −770.506 | 10.68 | | | 54.62 | | |
| 9 | 59.715 | 3.81 | 1.89286 | 20.4 | 50.66 | | |
| 10 | 74.063 | 8.36 | | | 49.33 | | |
| 11 | 58.185 | 2.00 | 1.65412 | 39.7 | 45.60 | | |
| 12 | 45.596 | 1.04 | | | 43.86 | | |
| 13 | 51.918 | 6.42 | 1.90366 | 31.3 | 43.79 | | |
| 14 | 206.154 | 3.00 | | | 42.24 | | |
| 15(aperture stop) | ∞ | (variable) | | | 40.40 | | |
| 16 | 2015.159 | 1.90 | 1.91082 | 35.3 | 37.51 | | |
| 17 | 32.641 | 3.50 | 1.84666 | 23.8 | 34.33 | | |
| 18 | 43.038 | (variable) | | | 33.42 | | |
| 19 | 64.610 | 5.62 | 1.49700 | 81.5 | 31.81 | | |
| 20 | −78.046 | 1.00 | | | 31.84 | | |
| 21 | 469.814 | 3.84 | 1.85478 | 24.8 | 30.43 | | |
| 22 | −64.210 | 1.50 | 1.60311 | 60.6 | 30.18 | | |
| 23 | 33.512 | 7.59 | | | 28.87 | | |
| 24 | −47.827 | 1.50 | 1.60311 | 60.6 | 29.44 | | |
| 25 | 93.980 | 2.80 | | | 31.60 | | |
| 26 | 77.014 | 6.40 | 1.59551 | 39.2 | 36.97 | | |
| 27 | −82.425 | 0.42 | | | 37.69 | | |
| 28 | 108.793 | 10.03 | 1.85478 | 24.8 | 38.99 | | |
| 29 | −32.591 | 2.00 | 1.89286 | 20.4 | 38.97 | | |
| 30 | 1236.437 | 63.67 | | | 39.14 | | |
| Image Plane | ∞ | | | | | | |

| Various Data | |
|---|---|
| Focal Length | 292.46 |
| F-number | 2.90 |
| Half Angle of View | 4.23 |
| Image Height | 21.64 |
| Overall Lens Length | 273.23 |
| BF | 63.67 |

| | ∞ | −0.16X |
|---|---|---|
| d12 | 2.91 | 10.48 |
| d15 | 17.66 | 10.09 |

| | |
|---|---|
| Position of Entrance Pupil | 301.22 |
| Position of Exit Pupil | −69.46 |
| Forward Principal Point Position | −48.75 |
| Rear Principal Point Position | −228.78 |

| Lens Unit Data | | | | |
|---|---|---|---|---|
| Unit | Starting Surface | Focal Length | Lens Structure Length | Forward Principal Point Position | Rear Principal Point Position |
| 1 | 1 | 112.19 | 140.87 | 122.13 | −68.98 |
| 2 | 16 | −47.10 | 5.40 | 2.77 | −0.11 |
| 3 | 19 | 167.49 | 42.71 | 18.20 | −15.09 |

| Single Lens Data | | |
|---|---|---|
| Lens | Starting Surface | Focal Length |
| 1 | 1 | 211.24 |
| 2 | 3 | 127.46 |
| 3 | 5 | −45.53 |
| 4 | 7 | 110.16 |
| 5 | 9 | 306.80 |
| 6 | 11 | −343.79 |
| 7 | 13 | 75.30 |
| 8 | 16 | −36.44 |

-continued

| Units: mm | | |
|---|---|---|
| 9 | 17 | 138.24 |
| 10 | 19 | 72.07 |
| 11 | 21 | 66.31 |
| 12 | 22 | −36.30 |
| 13 | 24 | −52.35 |
| 14 | 26 | 67.87 |
| 15 | 28 | 30.33 |
| 16 | 29 | −35.54 |

Numerical Example 12

| Units: mm | | | | | | |
|---|---|---|---|---|---|---|
| Surface Data | | | | | | |
| Surface Number | r | d | nd | vd | Effective Diameter | θgF | ΔθgF |
| 1 | 178.783 | 15.20 | 1.59270 | 35.3 | 135.31 | | |
| 2 | 1415.744 | 124.89 | | | 134.26 | | |
| 3 | 108.327 | 15.15 | 1.43387 | 95.1 | 78.98 | 0.5373 | 0.0201 |
| 4 | −192.136 | 0.15 | | | 76.97 | | |
| 5 | −197.207 | 3.00 | 1.85478 | 24.8 | 76.67 | 0.6122 | −0.0039 |
| 6 | 76.176 | 0.15 | | | 71.84 | | |
| 7 | 73.738 | 12.64 | 1.43387 | 95.1 | 72.03 | | |
| 8 | 13386.147 | 11.63 | | | 71.67 | | |
| 9 | 86.704 | 5.89 | 1.89286 | 20.4 | 68.81 | | |
| 10 | 159.733 | 33.10 | | | 67.66 | | |
| 11 | 69.154 | 2.30 | 1.65412 | 39.7 | 49.89 | | |
| 12 | 45.945 | 1.53 | | | 47.30 | | |
| 13 | 55.402 | 8.24 | 1.66672 | 48.3 | 47.22 | | |
| 14 | 2426.623 | 3.00 | | | 45.60 | | |
| 15(aperture stop) | ∞ | (variable) | | | 42.92 | | |
| 16 | 174.740 | 2.00 | 1.90366 | 31.3 | 40.00 | | |
| 17 | 37.347 | 4.13 | 1.49700 | 81.5 | 36.73 | | |
| 18 | 52.890 | (variable) | | | 35.68 | | |
| 19 | 87.342 | 4.14 | 1.84666 | 23.8 | 31.49 | | |
| 20 | 403.419 | 1.07 | | | 31.05 | | |
| 21 | 95.943 | 4.24 | 1.85478 | 24.8 | 32.55 | | |
| 22 | −94.709 | 1.50 | 1.76385 | 48.5 | 32.10 | | |
| 23 | 38.328 | 6.23 | | | 30.47 | | |
| 24 | −80.394 | 1.50 | 1.76385 | 48.5 | 30.84 | | |
| 25 | 109.369 | 3.26 | | | 32.09 | | |
| 26 | 72.385 | 12.53 | 1.67300 | 38.1 | 34.59 | | |
| 27 | −32.147 | 1.70 | 1.59522 | 67.7 | 35.84 | | |
| 28 | −300.120 | 0.15 | | | 37.16 | | |
| 29 | 144.097 | 9.42 | 1.85478 | 24.8 | 37.64 | | |
| 30 | −34.206 | 2.00 | 1.89286 | 20.4 | 37.67 | | |
| 31 | 1892.910 | 62.96 | | | 37.94 | | |
| Image Plane | ∞ | | | | | | |

| Various Data | |
|---|---|
| Focal Length | 392.56 |
| F-number | 2.90 |
| Half Angle of View | 3.15 |
| Image Height | 21.64 |
| Overall Lens Length | 371.23 |
| BF | 62.96 |

| | ∞ | −0.15X |
|---|---|---|
| d12 | 2.00 | 13.67 |
| d15 | 15.51 | 3.84 |

| | |
|---|---|
| Position of Entrance Pupil | 626.88 |
| Position of Exit Pupil | −63.48 |
| Forward Principal Point Position | −199.43 |
| Rear Principal Point Position | −329.61 |

Lens Unit Data

Units: mm

| Unit | Starting Surface | Focal Length | Lens Structure Length | Forward Principal Point Position | Rear Principal Point Position |
|---|---|---|---|---|---|
| 1 | 1 | 156.52 | 236.90 | 265.60 | −109.21 |
| 2 | 16 | −66.00 | 6.13 | 3.14 | −0.67 |
| 3 | 19 | 520.43 | 47.74 | 46.30 | 13.75 |

Single Lens Data

| Lens | Starting Surface | Focal Length |
|---|---|---|
| 1 | 1 | 343.67 |
| 2 | 3 | 162.13 |
| 3 | 5 | −63.96 |
| 4 | 7 | 170.85 |
| 5 | 9 | 204.61 |
| 6 | 11 | −217.83 |
| 7 | 13 | 84.92 |
| 8 | 16 | −52.93 |
| 9 | 17 | 234.98 |
| 10 | 19 | 130.88 |
| 11 | 21 | 56.34 |
| 12 | 22 | −35.55 |
| 13 | 24 | −60.45 |
| 14 | 26 | 34.75 |
| 15 | 27 | −60.63 |
| 16 | 29 | 33.15 |
| 17 | 30 | −37.61 |

Numerical Example 13

Units: mm

Surface Data

| Surface Number | r | d | nd | vd | Effective Diameter | θgF | ΔθgF |
|---|---|---|---|---|---|---|---|
| 1 | 163.339 | 13.35 | 1.59270 | 35.3 | 120.06 | | |
| 2 | 943.811 | 144.80 | | | 118.94 | | |
| 3 | 104.653 | 12.00 | 1.43387 | 95.1 | 61.40 | 0.5373 | 0.0201 |
| 4 | −116.617 | 0.15 | | | 59.82 | | |
| 5 | −117.086 | 2.30 | 1.85478 | 24.8 | 59.62 | 0.6122 | −0.0039 |
| 6 | 80.844 | 0.15 | | | 57.15 | | |
| 7 | 77.117 | 12.13 | 1.43387 | 95.1 | 57.26 | | |
| 8 | −114.243 | 0.15 | | | 57.03 | | |
| 9 | 95.689 | 3.57 | 1.89286 | 20.4 | 54.37 | | |
| 10 | 129.498 | 4.81 | | | 53.26 | | |
| 11 | −174.822 | 2.00 | 1.48749 | 70.2 | 53.26 | | |
| 12 | 146.631 | (variable) | | | 51.87 | | |
| 13 | 107.088 | 10.02 | 1.64769 | 33.8 | 49.80 | | |
| 14 | −72.534 | 2.20 | 1.58913 | 61.1 | 49.14 | | |
| 15 | −4440.551 | (variable) | | | 47.39 | | |
| 16(aperture stop) | ∞ | 8.01 | | | 40.94 | | |
| 17 | 702.560 | 1.90 | 1.84666 | 23.8 | 36.97 | | |
| 18 | 47.597 | 7.46 | 1.61340 | 44.3 | 35.58 | | |
| 19 | −126.474 | 19.15 | | | 35.02 | | |
| 20 | 122.013 | 3.76 | 1.84666 | 23.8 | 26.80 | | |
| 21 | −71.635 | 1.40 | 1.76385 | 48.5 | 26.39 | | |
| 22 | 34.538 | 6.95 | | | 25.37 | | |
| 23 | −64.820 | 1.40 | 1.76385 | 48.5 | 26.15 | | |
| 24 | 90.115 | 2.28 | | | 27.35 | | |
| 25 | 139.671 | 9.08 | 1.73800 | 32.3 | 29.11 | | |
| 26 | −21.978 | 1.70 | 1.76385 | 48.5 | 30.01 | | |
| 27 | −232.122 | 0.96 | | | 32.79 | | |

-continued

| Units: mm | | | | | |
|---|---|---|---|---|---|
| 28 | 78.499 | 8.15 | 1.73800 | 32.3 | 34.89 |
| 29 | −47.550 | 1.90 | 1.89286 | 20.4 | 35.24 |
| 30 | −127.714 | 82.50 | | | 35.96 |
| Image Plane | ∞ | | | | |

| Various Data | |
|---|---|
| Focal Length | 488.82 |
| F-number | 4.10 |
| Half Angle of View | 2.53 |
| Image Height | 21.64 |
| Overall Lens Length | 411.15 |
| BF | 82.50 |

| | ∞ | −0.14X |
|---|---|---|
| d12 | 43.95 | 24.39 |
| d15 | 2.95 | 22.51 |

| | |
|---|---|
| Position of Entrance Pupil | 760.74 |
| Position of Exit Pupil | −70.30 |
| Forward Principal Point Position | −314.21 |
| Rear Principal Point Position | −406.33 |

Lens Unit Data

| Unit | Starting Surface | Focal Length | Lens Structure Length | Forward Principal Point Position | Rear Principal Point Position |
|---|---|---|---|---|---|
| 1 | 1 | 680.35 | 195.41 | −475.01 | −383.69 |
| 2 | 13 | 143.84 | 12.22 | 0.85 | −6.65 |
| 3 | 16 | −147.89 | 74.11 | 8.88 | −61.93 |

Single Lens Data

| Lens | Starting Surface | Focal Length |
|---|---|---|
| 1 | 1 | 331.15 |
| 2 | 3 | 129.25 |
| 3 | 5 | −55.65 |
| 4 | 7 | 108.19 |
| 5 | 9 | 391.00 |
| 6 | 11 | −163.25 |
| 7 | 13 | 68.26 |
| 8 | 14 | −125.19 |
| 9 | 17 | −60.38 |
| 10 | 18 | 57.31 |
| 11 | 20 | 53.79 |
| 12 | 21 | −30.33 |
| 13 | 23 | −49.16 |
| 14 | 25 | 26.36 |
| 15 | 26 | −31.89 |
| 16 | 28 | 41.26 |
| 17 | 29 | −85.80 |

Numerical Example 14

| Units: mm | | | | | | | |
|---|---|---|---|---|---|---|---|
| Surface Data | | | | | | | |
| Surface Number | r | d | nd | vd | Effective Diameter | θgF | ΔθgF |
| 1 | 168.552 | 14.91 | 1.59270 | 35.3 | 133.65 | | |
| 2 | 853.592 | 122.18 | | | 132.49 | | |
| 3 | 148.612 | 11.95 | 1.43387 | 95.1 | 81.00 | 0.5373 | 0.0201 |
| 4 | −254.303 | 0.15 | | | 79.55 | | |
| 5 | −257.480 | 3.20 | 1.85478 | 24.8 | 79.38 | 0.6122 | −0.0039 |
| 6 | 141.530 | 0.15 | | | 76.27 | | |
| 7 | 127.364 | 12.78 | 1.43387 | 95.1 | 76.25 | | |

-continued

| | | Units: mm | | | |
|---|---|---|---|---|---|
| 8 | −174.232 | 0.15 | | | 75.68 |
| 9 | 577.170 | 3.41 | 1.89286 | 20.4 | 72.87 |
| 10 | 4707.875 | 3.60 | | | 72.09 |
| 11 | −190.967 | 3.00 | 1.80400 | 46.6 | 72.07 |
| 12 | 1388.400 | (variable) | | | 71.03 |
| 13 | 145.654 | 7.22 | 1.59551 | 39.2 | 58.51 |
| 14 | −226.906 | 2.80 | 1.67790 | 55.3 | 57.84 |
| 15 | 984.208 | (variable) | | | 56.57 |
| 16(aperture stop) | ∞ | 63.32 | | | 45.47 |
| 17 | −414.599 | 1.20 | 1.76385 | 48.5 | 20.91 |
| 18 | 29.784 | 4.80 | 1.54814 | 45.8 | 20.45 |
| 19 | −119.234 | 2.00 | | | 20.87 |
| 20 | 99.170 | 3.22 | 1.78472 | 25.7 | 25.23 |
| 21 | −62.702 | 1.30 | 1.76385 | 48.5 | 25.08 |
| 22 | 48.094 | 3.54 | | | 24.53 |
| 23 | −80.964 | 1.30 | 1.76385 | 48.5 | 24.69 |
| 24 | 140.808 | 1.27 | | | 25.34 |
| 25 | 57.182 | 13.30 | 1.67300 | 38.1 | 24.00 |
| 26 | −35.514 | 1.30 | 1.59522 | 67.7 | 25.49 |
| 27 | 74.378 | 17.60 | | | 26.08 |
| 28 | 112.883 | 7.02 | 1.65412 | 39.7 | 33.62 |
| 29 | −43.326 | 1.70 | 1.89286 | 20.4 | 33.92 |
| 30 | −99.977 | 84.94 | | | 34.71 |
| Image Plane | ∞ | | | | |

| Various Data | |
|---|---|
| Focal Length | 778.70 |
| F-number | 5.83 |
| Half Angle of View | 1.59 |
| Image Height | 21.64 |
| Overall Lens Length | 485.28 |
| BF | 84.94 |

| | ∞ | −0.14X |
|---|---|---|
| d12 | 88.70 | 58.25 |
| d15 | 3.28 | 33.73 |

| | |
|---|---|
| Position of Entrance Pupil | 834.02 |
| Position of Exit Pupil | −132.06 |
| Forward Principal Point Position | −1181.64 |
| Rear Principal Point Position | −693.76 |

Lens Unit Data

| Unit | Starting Surface | Focal Length | Lens Structure Length | Forward Principal Point Position | Rear Principal Point Position |
|---|---|---|---|---|---|
| 1 | 1 | 553.60 | 175.48 | −202.95 | −262.39 |
| 2 | 13 | 326.76 | 10.02 | −1.93 | −8.08 |
| 3 | 16 | −148.91 | 122.87 | 30.61 | −106.67 |

Single Lens Data

| Lens | Starting Surface | Focal Length |
|---|---|---|
| 1 | 1 | 351.50 |
| 2 | 3 | 218.15 |
| 3 | 5 | −106.45 |
| 4 | 7 | 171.79 |
| 5 | 9 | 736.46 |
| 6 | 11 | −208.62 |
| 7 | 13 | 150.05 |
| 8 | 14 | −271.75 |
| 9 | 17 | −36.34 |
| 10 | 18 | 43.98 |
| 11 | 20 | 49.38 |
| 12 | 21 | −35.45 |
| 13 | 23 | −67.13 |
| 14 | 25 | 34.55 |
| 15 | 26 | −40.21 |
| 16 | 28 | 48.73 |
| 17 | 29 | −86.87 |

TABLE

|  | Example 1 | Example 2 | Example 3 | Example 4 |
|---|---|---|---|---|
| (1) LD/f | 0.95 | 0.63 | 0.81 | 0.81 |
| (2) \|fG1p/fG1n\| | 3.97 | 2.22 | 4.05 | 2.19 |
| (3) vdG1n | 24.8 | 32.3 | 32.3 | 38.1 |
| (4) ΔθgF_G1n | −0.0039 | −0.0031 | −0.0031 | −0.0022 |
| (5) D12/LD | 0.27 | 0.27 | 0.32 | 0.26 |
| (6) \|fG1p/fG2p\| | 1.68 | 1.92 | 2.61 | 2.33 |
| (7) vdG2p | 95.10 | 95.10 | 95.10 | 95.10 |
| (8) ΔθgF_G2p | 0.0201 | 0.0201 | 0.0201 | 0.0201 |

|  | Example 5 | Example 6 | Example 7 | Example 8 |
|---|---|---|---|---|
| (1) LD/f | 0.84 | 0.84 | 0.95 | 0.95 |
| (2) \|fG1p/fG1n\| | 2.93 | 2.91 | 2.31 | 2.14 |
| (3) vdG1n | 32.3 | 35.3 | 32.3 | 34.7 |
| (4) ΔθgF_G1n | −0.0031 | −0.0029 | −0.0031 | −0.0029 |
| (5) D12/LD | 0.24 | 0.23 | 0.20 | 0.21 |
| (6) fG1p/fG2p | 1.95 | 1.89 | 1.76 | 2.17 |
| (7) vdG2p | 95.10 | 95.10 | 95.10 | 95.10 |
| (8) ΔθgF_G2p | 0.0201 | 0.0201 | 0.0201 | 0.0201 |

|  | Example 9 | Example 10 | Example 11 | Example 12 |
|---|---|---|---|---|
| (1) LD/f | 0.95 | 0.93 | 0.93 | 0.95 |
| (2) \|fG1p/fG1n\| | 2.52 | 2.05 | 4.64 | 5.37 |
| (3) vdG1n | 32.3 | 24.8 | 24.8 | 24.8 |
| (4) ΔθgF_G1n | −0.0031 | −0.0039 | −0.0039 | −0.0039 |
| (5) D12/LD | 0.22 | 0.18 | 0.24 | 0.34 |
| (6) fG1p/fG2p | 1.90 | 1.96 | 1.66 | 2.12 |
| (7) vdG2p | 95.10 | 95.10 | 95.10 | 95.10 |
| (8) ΔθgF_G2p | 0.0201 | 0.0201 | 0.0201 | 0.0201 |

|  |  | Example 13 | Example 14 |
|---|---|---|---|
| (1) | LD/f | 0.84 | 0.62 |
| (2) | \|fG1p/fG1n\| | 5.95 | 3.30 |
| (3) | vdG1n | 24.8 | 24.8 |
| (4) | ΔθgF_G1n | −0.0039 | −0.0039 |
| (5) | D12/LD | 0.35 | 0.25 |
| (6) | fG1p/fG2p | 2.56 | 1.61 |
| (7) | vdG2p | 95.10 | 95.10 |
| (8) | ΔθgF_G2p | 0.0201 | 0.0201 |

Next, an embodiment of a digital still camera (image pickup apparatus) using the optical system according to the present embodiment as an image pickup optical system is described with reference to FIG. 29. In FIG. 29, reference numeral 10 denotes a camera body and reference numeral 11 denotes an image taking optical system, which is any one of the optical systems according to the first to fourteenth embodiments. Reference numeral 12 denotes a solid-state image pickup element (photoelectric conversion element), such as a CCD sensor or a CMOS sensor, that is installed in the camera body and that receives an image of an object formed by the image taking optical system 11.

By applying the optical system according to the present embodiment to an image pickup apparatus, such as a digital still camera, in this way, it is possible to provide a light image pickup apparatus whose aberrations, such as chromatic aberrations, are properly corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-109657 filed Jun. 1, 2016, which is hereby incorporated by reference herein in its entirety.

What is claimed is:

1. An optical system comprising:
a first lens unit having positive refractive power;
a second lens unit having positive refractive power or negative refractive power; and
a third lens unit having positive refractive power or negative refractive power,
wherein the first lens unit, the second lens unit, and the third lens unit are disposed in that order from an object side to an image side,
wherein, during focusing, the second lens unit moves to change an interval between adjacent lens units,
wherein the first lens unit includes a positive lens G1p that is disposed closest to the object side, a positive lens G2p that is disposed adjacent to the image side of the positive lens G1p, and a negative lens G1n that is disposed on the image side of the positive lens G2p and that is disposed closest to the object side among negative lenses that are included in the first lens unit, and
wherein the following conditional expressions are satisfied:

$LD/f < 1.0;$ $2.00 < |fG1p/fG1n| < 10.00;$ $20.0 < vdG1n < 40.0;$ $-0.1000 < \theta gF\_G1n - (-1.665 \times 10^{-7} \times vdG1n^3 + 5.213 \times 10^{-5} \times vdG1n^2 - 5.656 \times 10^{-3} \times vdG1n + 0.7268) < -0.0010;$ and $0.18 > D12/LD < 0.50,$ where f is a focal length of the optical system, LD is a distance along an optical axis of the optical system from a lens surface of the first lens unit that is closest to the object side to an image plane, fG1p is a focal length of the positive lens G1p, fG1n is a focal length of the negative lens G1n, vdG1n is an Abbe number of a material of the negative lens G1n, θgF_G1n is a partial dispersion ratio of the material of the negative lens G1n, and D12 is a distance along the optical axis between the positive lens G1p and the positive lens G2p.

2. The optical system according to claim 1, wherein the following conditional expression is satisfied:

$1.5 < fG1p/fG2p < 5.0,$ where fG2p is a focal length of the position lens G2p.

3. The optical system according to claim 1, wherein the following conditional expression is satisfied:

$vdG2p > 73.0,$ where vdG2p is an Abbe number of a material of the positive lens G2p.

4. The optical system according to claim 1, wherein the following conditional expression is satisfied:

$0.0100 < \theta gF\_G2p - (-1.665 \times 10^{-7} \times vdG2p^3 + 5.213 \times 10^{-5} \times vdG2p^2 - 5.656 \times 10^{-3} \times vdG2p + 0.7268) < 0.1000,$ where vdG2p is an Abbe number of a material of the positive lens G2p, and θgF G2p is a partial dispersion ratio of the material of the positive lens G2p.

5. The optical system according to claim 1, wherein the second lens unit includes a positive lens and a negative lens.

6. The optical system according to claim 1, wherein the second lens unit consists of two lenses or less.

7. An image pickup apparatus, comprising:
an optical system; and
an image pickup element configured to receive an image formed by the optical system,
wherein the optical system comprises: a first lens unit having positive refractive power; a second lens unit having positive refractive power or negative refractive power; and a third lens unit having positive refractive power or negative refractive power,
wherein the first lens unit, the second lens unit, and the third lens unit are disposed in that order from an object side to an image side,
wherein, during focusing, the second lens unit moves to change an interval between adjacent lens units,
wherein the first lens unit includes a positive lens G1p that is disposed closest to the object side, a positive lens G2p that is disposed adjacent to the image side of the positive lens G1p, and a negative lens G1n that is disposed on the image side of the positive lens G2p and that is disposed closest to the object side among negative lenses that are included in the first lens unit, and
wherein the following conditional expressions are satisfied:

$LD/f < 1.0;$ $2.00 < |fG1p/fG1n| < 10.00;$ $20.0 < vdG1n < 40.0;$ $-0.1000 < \theta gF\_G1n - (-1.665 \times 10^{-7} \times vdG1n^3 + 5.213 \times 10^{-5} \times vdG1n^2 - 5.656 \times 10^{-3} \times vdG1n + 0.7268) < -0.0010;$ and $0.18 > D12/LD < 0.50,$ where f is a focal length of the optical system, LD is a distance along an optical axis of the optical system from a lens surface of the first lens unit that is closest to the object side to an image plane, fG1p is a focal length of the positive lens G1p, fG1n is a focal length of the negative lens G1n, vdG1n is an Abbe number of a material of the negative lens G1n, θgF_G1n is a partial dispersion ratio of the material of the negative lens G1n, and D12 is a distance along the optical axis between the positive lens G1p and the positive lens G2p.

* * * * *

UNITED STATES PATENT AND TRADEMARK OFFICE
CERTIFICATE OF CORRECTION

PATENT NO. : 10,228,534 B2
APPLICATION NO. : 15/607185
DATED : March 12, 2019
INVENTOR(S) : Yuichi Gyoda Page 1 of 1

It is certified that error appears in the above-identified patent and that said Letters Patent is hereby corrected as shown below:

In the Claims

The conditional expression described in Column 46, Line 33 in Claim 1 and Column 48, Line 11 in Claim 7 should recite:
$0.18 \leqq D12/LD < 0.50$ Signed and Sealed this
Twenty-fifth Day of June, 2019

Andrei Iancu
*Director of the United States Patent and Trademark Office*